(12) United States Patent
Helin et al.

(10) Patent No.: US 9,163,707 B2
(45) Date of Patent: Oct. 20, 2015

(54) METHOD FOR CONTROLLING THE SPEED OF A SELF-PROPELLED WALK-BEHIND LAWN MOWER

(71) Applicant: MTD PRODUCTS INC, Valley City, OH (US)

(72) Inventors: Philip Helin, Peninsula, OH (US); Rick Baehr, Wellington, OH (US)

(73) Assignee: MTD Products Inc, Valley City, OH (US)

( * ) Notice: Subject to any disclaimer, the term of this patent is extended or adjusted under 35 U.S.C. 154(b) by 0 days.

(21) Appl. No.: 14/230,361

(22) Filed: Mar. 31, 2014

(65) Prior Publication Data

US 2014/0208709 A1 Jul. 31, 2014

Related U.S. Application Data

(63) Continuation of application No. 13/250,209, filed on Sep. 30, 2011.

(51) Int. Cl.
*A01D 69/00* (2006.01)
*F16H 9/12* (2006.01)
(Continued)

(52) U.S. Cl.
CPC ............... *F16H 9/12* (2013.01); *A01D 34/006* (2013.01); *A01D 34/6806* (2013.01); *A01D 34/824* (2013.01); *F16H 9/125* (2013.01);
(Continued)

(58) Field of Classification Search
CPC .............. A01D 2034/6843; A01D 34/824; A01D 2101/00; A01D 34/6806; A01D 34/67
USPC ......... 56/10.8, 11.3, 11.7, 11.8, 11.4, DIG. 6; 180/19.3, 324; 474/37, 19, 46, 69, 8
See application file for complete search history.

(56) References Cited

U.S. PATENT DOCUMENTS 2,096,911 A 10/1937 Moore, Jr.
2,689,620 A 9/1954 Hainke
(Continued)

FOREIGN PATENT DOCUMENTS

AU 50284/64 4/1967
DE 3136142 A1 3/1983
(Continued)

OTHER PUBLICATIONS

Sears website for Craftsman 190cc 22" Briggs & Stratton Rear Bag Rear High Wheel Front Propelled Lawn Mower (Model 37653), Feb. 2009.
(Continued)

*Primary Examiner* — Árpád Fábián-Kovács
(74) *Attorney, Agent, or Firm* — Wegman, Hessler & Vanderburg

(57) ABSTRACT

A method for controlling the speed of the self-propelled transmission assembly for a walk-behind lawn mower is provided. The speed control mechanism is also configured to control the relative output speed of the transmission assembly. The speed control mechanism includes a speed engagement assembly and a speed adjustment assembly, wherein the speed engagement assembly includes a pair of rotatable levers for causing the transmission assembly to actuate between a disengaged position and an engaged position and the speed adjustment assembly includes a rotatable knob for causing the relative output speed of the transmission assembly to the wheels of the lawn mower to increase or decrease.

10 Claims, 15 Drawing Sheets

(51) Int. Cl.
 A01D 34/68 (2006.01)
 A01D 34/82 (2006.01)
 A01D 34/00 (2006.01)
 F16H 59/02 (2006.01)
 F16H 59/06 (2006.01)

(52) U.S. Cl.
 CPC ............ *F16H59/0278* (2013.01); *F16H 59/06* (2013.01); *Y10T 74/2014* (2015.01)

(56) References Cited

U.S. PATENT DOCUMENTS

| | | |
|---|---|---|
| 2,818,699 A | 1/1958 | Clemson |
| 3,529,482 A | 9/1970 | Jackson et al. |
| 3,934,510 A | 1/1976 | Dahl |
| 3,954,022 A | 5/1976 | Hemens |
| 3,957,138 A | 5/1976 | Kine |
| 3,960,032 A | 6/1976 | Schiff |
| 3,976,382 A | 8/1976 | Westby |
| 3,990,715 A | 11/1976 | Shimada |
| 4,014,281 A | 3/1977 | Hemens |
| 4,026,239 A | 5/1977 | Andvig |
| 4,027,746 A | 6/1977 | Kine |
| 4,028,804 A | 6/1977 | Hammond |
| 4,030,375 A | 6/1977 | Nagano |
| 4,034,835 A | 7/1977 | Baba |
| 4,039,268 A | 8/1977 | Cotton |
| 4,062,135 A | 12/1977 | Dobberpuhl |
| 4,062,251 A | 12/1977 | Parsons |
| 4,092,905 A | 6/1978 | Wood |
| 4,106,168 A | 8/1978 | Parsons |
| 4,117,652 A | 10/1978 | Jones et al. |
| 4,144,956 A | 3/1979 | Baba |
| 4,157,068 A | 6/1979 | Rognmo |
| 4,160,393 A | 7/1979 | Fukui |
| 4,167,221 A | 9/1979 | Edmonson et al. |
| 4,173,157 A | 11/1979 | Miller et al. |
| 4,179,013 A | 12/1979 | Kine |
| 4,185,517 A | 1/1980 | Gill et al. |
| 4,229,987 A | 10/1980 | Fujimoto |
| 4,232,771 A | 11/1980 | Prince |
| 4,238,972 A | 12/1980 | Hemens |
| 4,248,153 A | 2/1981 | Sjotun et al. |
| 4,259,879 A | 4/1981 | Watarai |
| 4,261,220 A | 4/1981 | Gill |
| 4,267,775 A | 5/1981 | Sjotun et al. |
| 4,271,700 A | 6/1981 | Tschanz et al. |
| 4,309,862 A | 1/1982 | Carlson |
| 4,322,209 A | 3/1982 | Shimano |
| 4,324,148 A | 4/1982 | Sildve |
| 4,325,467 A | 4/1982 | Kine |
| 4,333,361 A | 6/1982 | Spease |
| 4,348,348 A | 9/1982 | Bennett et al. |
| 4,362,287 A | 12/1982 | Gongstad |
| 4,380,178 A | 4/1983 | Bennett et al. |
| 4,384,497 A | 5/1983 | Gatsos |
| 4,386,755 A | 6/1983 | Bennett et al. |
| 4,406,177 A | 9/1983 | Bennett et al. |
| 4,413,466 A | 11/1983 | Beugelsdyk et al. |
| 4,428,180 A | 1/1984 | Carlson |
| 4,428,714 A | 1/1984 | Mowill |
| 4,438,658 A | 3/1984 | Carlson |
| 4,459,802 A | 7/1984 | Mowill |
| 4,459,870 A | 7/1984 | Gill et al. |
| 4,460,313 A | 7/1984 | Austrem |
| 4,479,755 A | 10/1984 | Skoe |
| 4,486,184 A | 12/1984 | Campagnolo |
| 4,503,730 A | 3/1985 | Irvin |
| 4,530,639 A | 7/1985 | Mowill |
| 4,530,677 A | 7/1985 | Nagano |
| 4,538,410 A | 9/1985 | Klaebo |
| 4,540,337 A | 9/1985 | Olsen |
| 4,549,847 A | 10/1985 | Stroem et al. |
| 4,558,558 A | 12/1985 | Horner, Jr. et al. |
| 4,572,053 A | 2/1986 | Sosnowski et al. |
| 4,573,315 A | 3/1986 | Stroem |
| 4,573,868 A | 3/1986 | Stroem et al. |
| 4,583,787 A | 4/1986 | Michelotti |
| 4,590,819 A | 5/1986 | Spease et al. |
| 4,591,026 A | 5/1986 | Nagano |
| 4,606,237 A | 8/1986 | Crack |
| 4,617,006 A | 10/1986 | Nagano |
| 4,624,104 A | 11/1986 | Stroem |
| 4,625,579 A | 12/1986 | Spease |
| 4,626,229 A | 12/1986 | Nagano |
| 4,628,687 A | 12/1986 | Strom |
| 4,637,809 A | 1/1987 | Nagano |
| 4,641,495 A | 2/1987 | Mowill |
| 4,642,032 A | 2/1987 | McBeth |
| 4,642,072 A | 2/1987 | Nagano |
| 4,649,010 A | 3/1987 | Bennett et al. |
| 4,651,534 A | 3/1987 | Stroem |
| 4,667,881 A | 5/1987 | Michelotti |
| 4,675,952 A | 6/1987 | Nagano |
| 4,678,396 A | 7/1987 | Mowill |
| 4,682,514 A | 7/1987 | Jona |
| 4,688,445 A | 8/1987 | Spease et al. |
| 4,699,605 A | 10/1987 | Jona |
| 4,704,861 A | 11/1987 | Mowill |
| 4,726,251 A | 2/1988 | Niskanen |
| 4,730,853 A | 3/1988 | Gjessing |
| 4,738,084 A | 4/1988 | Ogano et al. |
| 4,751,850 A | 6/1988 | Nagano |
| 4,753,062 A | 6/1988 | Roelle |
| 4,754,853 A | 7/1988 | Nagano |
| 4,765,199 A | 8/1988 | Andersen et al. |
| RE32,756 E | 9/1988 | Mowill |
| 4,774,418 A | 9/1988 | Kjersem |
| 4,787,266 A | 11/1988 | Romano |
| 4,793,050 A | 12/1988 | Niskanen |
| 4,794,817 A | 1/1989 | Romano |
| 4,801,287 A | 1/1989 | Romano |
| 4,805,386 A | 2/1989 | Urban |
| 4,813,214 A | 3/1989 | Barnard et al. |
| 4,815,330 A | 3/1989 | Nagano |
| 4,819,497 A | 4/1989 | Romano |
| 4,824,420 A | 4/1989 | Romano |
| 4,833,935 A | 5/1989 | Roelle |
| 4,835,949 A | 6/1989 | Seyerle |
| 4,836,604 A | 6/1989 | Romano |
| 4,838,837 A | 6/1989 | Testa |
| 4,840,605 A | 6/1989 | Testa |
| 4,850,182 A | 7/1989 | Barnard et al. |
| 4,856,365 A | 8/1989 | Romano |
| 4,857,036 A | 8/1989 | Romano |
| 4,859,984 A | 8/1989 | Romano |
| 4,869,124 A | 9/1989 | Czeban et al. |
| 4,869,351 A | 9/1989 | Romano |
| 4,872,365 A | 10/1989 | Wolf |
| 4,876,913 A | 10/1989 | Romano |
| 4,878,395 A | 11/1989 | Romano |
| 4,878,884 A | 11/1989 | Romano |
| 4,881,447 A | 11/1989 | Yanusko et al. |
| 4,882,971 A | 11/1989 | Yanusko et al. |
| 4,887,482 A | 12/1989 | Romano |
| 4,898,064 A | 2/1990 | Romano |
| 4,898,077 A | 2/1990 | McBeth |
| 4,907,401 A * | 3/1990 | Nemoto et al. ............... 56/11.3 |
| 4,909,095 A | 3/1990 | Carlson |
| 4,919,004 A | 4/1990 | Nagano |
| 4,922,786 A | 5/1990 | Romano |
| 4,930,368 A | 6/1990 | Nagano |
| 4,930,369 A | 6/1990 | Barnard et al. |
| 4,936,160 A | 6/1990 | Barnard et al. |
| 4,945,785 A | 8/1990 | Romano |
| 4,946,181 A | 8/1990 | Romano |
| 4,949,591 A | 8/1990 | Roelle |
| 4,974,469 A | 12/1990 | Romano |
| 5,000,059 A | 3/1991 | Barnard |
| 5,012,692 A | 5/1991 | Nagano |
| D318,158 S | 7/1991 | Ediger et al. |
| 5,044,213 A | 9/1991 | Nagano |
| D320,730 S | 10/1991 | Ediger et al. |
| 5,052,241 A | 10/1991 | Nagano |

(56) References Cited

U.S. PATENT DOCUMENTS

| | | |
|---|---|---|
| 5,058,462 A | 10/1991 | Killiany et al. |
| 5,062,516 A | 11/1991 | Prince |
| 5,065,961 A | 11/1991 | Ellis et al. |
| 5,066,264 A | 11/1991 | Romano |
| 5,077,959 A | 1/1992 | Wenzel |
| 5,078,664 A | 1/1992 | Nagano |
| 5,081,883 A | 1/1992 | Romano |
| 5,088,664 A | 2/1992 | Ellis et al. |
| 5,092,542 A | 3/1992 | Ellis et al. |
| 5,095,768 A | 3/1992 | Nagano |
| 5,134,897 A | 8/1992 | Romano |
| 5,142,933 A | 9/1992 | Kelley |
| 5,146,735 A | 9/1992 | McDonner |
| 5,156,063 A | 10/1992 | Kelley |
| 5,186,072 A | 2/1993 | Nagano |
| 5,199,321 A | 4/1993 | Nowak |
| 5,201,236 A | 4/1993 | Nagano |
| 5,203,213 A | 4/1993 | Nagano |
| 5,213,005 A | 5/1993 | Nagano |
| 5,222,412 A | 6/1993 | Nagano |
| D338,441 S | 8/1993 | Deubner |
| 5,241,878 A | 9/1993 | Nagano |
| 5,246,402 A | 9/1993 | Romano |
| 5,251,711 A * | 10/1993 | Meyer et al. ............... 180/19.1 |
| 5,257,683 A | 11/1993 | Romano |
| 5,261,293 A | 11/1993 | Kelley |
| 5,273,500 A | 12/1993 | Nagano |
| D344,090 S | 2/1994 | Barnard |
| 5,287,766 A | 2/1994 | Nagano |
| 5,297,379 A | 3/1994 | Smith |
| 5,312,166 A | 5/1994 | Nagano |
| 5,321,994 A | 6/1994 | Barnard |
| 5,322,487 A | 6/1994 | Nagano |
| 5,337,564 A | 8/1994 | Bakke et al. |
| 5,355,662 A | 10/1994 | Schmidt |
| D352,410 S | 11/1994 | Barnard |
| 5,375,674 A | 12/1994 | Peter |
| 5,377,774 A | 1/1995 | Lohr |
| 5,400,675 A | 3/1995 | Nagano |
| 5,419,218 A | 5/1995 | Romano |
| 5,421,435 A | 6/1995 | Hanada |
| 5,425,434 A | 6/1995 | Romano |
| 5,427,003 A | 6/1995 | Boltak et al. |
| 5,437,582 A | 8/1995 | Romano |
| 5,448,926 A | 9/1995 | Reasoner |
| D363,868 S | 11/1995 | Israel et al. |
| 5,467,583 A | 11/1995 | Beugelsdyk et al. |
| 5,470,277 A | 11/1995 | Romano |
| D366,738 S | 1/1996 | Israel |
| 5,479,776 A | 1/1996 | Romano |
| 5,479,779 A | 1/1996 | Havdal |
| 5,480,356 A | 1/1996 | Campagnolo |
| 5,481,877 A | 1/1996 | Bakke et al. |
| 5,488,818 A | 2/1996 | Powers et al. |
| 5,493,934 A | 2/1996 | Kelley |
| 5,497,676 A | 3/1996 | Barnard |
| 5,511,367 A | 4/1996 | Powers et al. |
| 5,520,070 A | 5/1996 | Beugelsdyk et al. |
| 5,524,734 A | 6/1996 | Hanada |
| 5,531,134 A | 7/1996 | Petruccello |
| 5,535,855 A | 7/1996 | Hanada |
| 5,537,891 A | 7/1996 | Nagano et al. |
| 5,547,069 A | 8/1996 | Pritchard |
| 5,553,822 A | 9/1996 | Barnard et al. |
| 5,555,769 A | 9/1996 | Lichtenberg |
| D374,387 S | 10/1996 | Schaffer |
| 5,562,563 A | 10/1996 | Shoge |
| 5,564,310 A | 10/1996 | Kishimoto |
| 5,570,612 A | 11/1996 | Reasoner |
| 5,577,969 A | 11/1996 | Watarai |
| D377,698 S | 1/1997 | Schaffer |
| 5,596,909 A | 1/1997 | Cox et al. |
| 5,605,074 A | 2/1997 | Hall et al. |
| 5,609,064 A | 3/1997 | Abe |
| 5,615,583 A | 4/1997 | Cunningham et al. |
| D379,292 S | 5/1997 | Schaffer et al. |
| 5,632,182 A | 5/1997 | Reasoner |
| 5,634,379 A | 6/1997 | Barnard |
| 5,638,680 A | 6/1997 | Iversen |
| 5,642,793 A | 7/1997 | Ljosne |
| 5,653,649 A | 8/1997 | Watarai |
| 5,657,669 A | 8/1997 | Barnard |
| 5,676,021 A | 10/1997 | Campagnolo |
| 5,678,455 A | 10/1997 | Watarai |
| 5,680,748 A | 10/1997 | Barnard |
| 5,682,794 A | 11/1997 | Shibata |
| 5,682,798 A | 11/1997 | Malone |
| D388,569 S | 12/1997 | Israel |
| 5,701,786 A | 12/1997 | Kawakami |
| 5,701,967 A | 12/1997 | Barnard |
| D388,681 S | 1/1998 | Schaffer et al. |
| 5,728,121 A | 3/1998 | Bimbo et al. |
| 5,741,196 A | 4/1998 | Campagnolo |
| 5,752,414 A | 5/1998 | Reasoner et al. |
| 5,755,139 A | 5/1998 | Kojima |
| 5,771,927 A | 6/1998 | Johansen et al. |
| 5,775,168 A | 7/1998 | Furuta |
| 5,782,712 A | 7/1998 | Campagnolo |
| 5,785,625 A | 7/1998 | Matsuo et al. |
| 5,791,195 A | 8/1998 | Campagnolo |
| 5,791,200 A | 8/1998 | Papasideris |
| 5,795,036 A | 8/1998 | Campagnolo |
| 5,795,263 A | 8/1998 | Harries |
| 5,799,542 A | 9/1998 | Yamane |
| 5,803,654 A | 9/1998 | Spease et al. |
| 5,803,689 A | 9/1998 | Magnus et al. |
| 5,803,847 A * | 9/1998 | Kamm ............................ 474/37 |
| 5,806,372 A | 9/1998 | Campagnolo |
| 5,810,515 A | 9/1998 | Fredriksen et al. |
| 5,813,284 A | 9/1998 | Cox |
| 5,819,585 A | 10/1998 | Darnell |
| 5,832,782 A | 11/1998 | Kawakami |
| 5,836,207 A | 11/1998 | Spooner et al. |
| 5,836,347 A | 11/1998 | Harries |
| 5,839,544 A | 11/1998 | Yamashita |
| 5,845,537 A | 12/1998 | Campagnolo |
| 5,850,844 A | 12/1998 | Iversen |
| 5,857,386 A | 1/1999 | Ruhlman |
| 5,860,303 A | 1/1999 | Droz et al. |
| 5,862,709 A | 1/1999 | Kageyama |
| D405,680 S | 2/1999 | Beugelsdyk et al. |
| 5,864,951 A | 2/1999 | Campagnolo |
| 5,865,454 A | 2/1999 | Campagnolo |
| 5,882,274 A | 3/1999 | Shoge |
| 5,893,574 A | 4/1999 | Campagnolo |
| D409,479 S | 5/1999 | Beugelsdyk et al. |
| 5,900,705 A | 5/1999 | Kimura |
| 5,906,139 A | 5/1999 | Beugelsdyk et al. |
| 5,911,791 A | 6/1999 | Srinivas |
| 5,913,388 A | 6/1999 | Ota et al. |
| 5,915,487 A | 6/1999 | Splittstoesser et al. |
| 5,921,138 A | 7/1999 | Kojima et al. |
| 5,921,139 A | 7/1999 | Yamane |
| 5,921,713 A | 7/1999 | Gjessing et al. |
| 5,924,328 A | 7/1999 | Okajima et al. |
| 5,928,103 A | 7/1999 | Shoge |
| 5,934,150 A | 8/1999 | Srinivas et al. |
| 5,935,034 A | 8/1999 | Campagnolo |
| 5,961,416 A | 10/1999 | Shoge |
| 5,961,420 A | 10/1999 | Darnell |
| 5,964,125 A | 10/1999 | Rixon et al. |
| 5,964,678 A | 10/1999 | Hanada et al. |
| 5,964,679 A | 10/1999 | Matsuo et al. |
| 5,967,937 A | 10/1999 | Matsu |
| 5,975,646 A | 11/1999 | Campagnolo |
| 5,979,266 A | 11/1999 | Nagano |
| 5,988,325 A | 11/1999 | Matsueda |
| 5,992,590 A | 11/1999 | Harries |
| 5,993,355 A | 11/1999 | Nordgard |
| 5,997,104 A | 12/1999 | Campagnolo |
| 6,003,402 A | 12/1999 | Lichtenberg |
| 6,016,717 A | 1/2000 | Wheeler |
| 6,023,993 A | 2/2000 | Beugelsdyk et al. |
| 6,036,279 A | 3/2000 | Campagnolo |

(56) References Cited

U.S. PATENT DOCUMENTS

| | | |
|---|---|---|
| 6,038,939 A | 3/2000 | Wheeler |
| 6,039,024 A | 3/2000 | Carlson et al. |
| 6,047,614 A | 4/2000 | Beugelsdyk et al. |
| D425,784 S | 5/2000 | Beugelsdyk et al. |
| 6,056,020 A | 5/2000 | Malone |
| 6,057,657 A | 5/2000 | Kitamura |
| 6,066,057 A | 5/2000 | Nakamura et al. |
| RE36,722 E | 6/2000 | Reasoner |
| 6,070,487 A | 6/2000 | Beugelsdyk et al. |
| 6,082,083 A | 7/2000 | Stalpes et al. |
| 6,105,348 A | 8/2000 | Turk et al. |
| 6,124,577 A | 9/2000 | Fristedt |
| 6,129,803 A | 10/2000 | Kester |
| 6,132,327 A | 10/2000 | Campagnolo |
| 6,134,980 A | 10/2000 | Uchiyama |
| 6,135,906 A | 10/2000 | Ichida |
| 6,142,281 A | 11/2000 | Campagnolo |
| 6,146,297 A | 11/2000 | Kimura |
| 6,147,332 A | 11/2000 | Holmberg et al. |
| 6,149,541 A | 11/2000 | Nakamura et al. |
| 6,152,847 A | 11/2000 | Matsuo et al. |
| 6,155,383 A | 12/2000 | Sugimoto |
| 6,158,299 A | 12/2000 | Czajkowski |
| 6,159,119 A | 12/2000 | Nakamura et al. |
| 6,164,677 A | 12/2000 | Matsuo et al. |
| D436,114 S | 1/2001 | Beugelsdyk et al. |
| 6,170,356 B1 | 1/2001 | Campagnolo |
| 6,173,625 B1 | 1/2001 | McFarlane et al. |
| RE37,099 E | 3/2001 | Hanada |
| 6,196,757 B1 | 3/2001 | Bakke |
| 6,199,446 B1 | 3/2001 | Ose |
| 6,205,883 B1 | 3/2001 | Bortolon |
| 6,206,799 B1 | 3/2001 | Matsuo et al. |
| 6,209,417 B1 | 4/2001 | Munger et al. |
| 6,209,418 B1 | 4/2001 | Kalsi et al. |
| 6,212,970 B1 | 4/2001 | Bortolon |
| 6,213,910 B1 | 4/2001 | Matsuo et al. |
| 6,220,112 B1 | 4/2001 | Graham et al. |
| 6,220,222 B1 | 4/2001 | Kalsi |
| 6,223,533 B1 | 5/2001 | Schlaupitz |
| 6,230,579 B1 | 5/2001 | Reasoner et al. |
| 6,231,476 B1 | 5/2001 | Reasoner et al. |
| 6,237,435 B1 | 5/2001 | Gronhage et al. |
| 6,241,068 B1 | 6/2001 | Meyer |
| 6,244,127 B1 | 6/2001 | Benda et al. |
| 6,244,415 B1 | 6/2001 | Fujii |
| 6,263,859 B1 | 7/2001 | Kalsi |
| 6,278,090 B1 | 8/2001 | Fristedt et al. |
| D448,345 S | 9/2001 | Fristedt |
| 6,282,979 B1 | 9/2001 | Meyer |
| 6,289,763 B1 | 9/2001 | Rixon et al. |
| 6,293,881 B1 | 9/2001 | Ichida |
| 6,293,882 B1 | 9/2001 | Kitamura et al. |
| 6,295,890 B2 | 10/2001 | Rixon et al. |
| 6,298,748 B1 | 10/2001 | Rixon et al. |
| 6,312,355 B1 | 11/2001 | Nishimoto |
| 6,314,831 B2 | 11/2001 | Rixon et al. |
| 6,324,883 B1 | 12/2001 | Rennehvammen |
| 6,324,938 B1 | 12/2001 | Okouchi |
| 6,325,158 B1 | 12/2001 | Rangnes et al. |
| 6,325,386 B1 | 12/2001 | Shoge |
| 6,327,931 B1 | 12/2001 | Skogward |
| 6,330,838 B1 | 12/2001 | Kalsi |
| 6,338,286 B1 | 1/2002 | Skogward et al. |
| 6,350,212 B1 | 2/2002 | Campagnolo |
| 6,354,170 B1 | 3/2002 | Beugelsdyk et al. |
| 6,357,319 B2 | 3/2002 | Benda et al. |
| 6,364,799 B1 | 4/2002 | Campagnolo |
| 6,367,142 B2 | 4/2002 | Meyer |
| 6,394,236 B1 | 5/2002 | Matsuishita |
| RE37,728 E | 6/2002 | Kamm |
| D458,202 S | 6/2002 | Passarotto |
| 6,408,949 B1 | 6/2002 | Aquilera et al. |
| 6,412,555 B1 | 7/2002 | Sten-Halvorsen et al. |
| 6,412,605 B2 | 7/2002 | Campagnolo |
| 6,415,677 B1 | 7/2002 | Skogward |
| 6,427,553 B1 | 8/2002 | Hogberg et al. |
| 6,431,575 B2 | 8/2002 | Campagnolo |
| 6,435,056 B2 | 8/2002 | Meyer |
| 6,443,024 B1 | 9/2002 | Skogward |
| 6,443,032 B1 | 9/2002 | Fujii et al. |
| 6,443,287 B2 | 9/2002 | Bjorkgard |
| 6,450,059 B1 | 9/2002 | Ose |
| 6,450,801 B1 | 9/2002 | Wilnechenko et al. |
| 6,453,764 B1 | 9/2002 | Ose |
| D464,557 S | 10/2002 | Alejandro |
| 6,470,973 B1 | 10/2002 | Rangnes et al. |
| 6,474,746 B2 | 11/2002 | Campagnolo |
| 6,475,109 B2 * | 11/2002 | Blanchard ................ 474/101 |
| 6,490,507 B1 | 12/2002 | Campagnolo |
| 6,491,350 B2 | 12/2002 | Passarotto |
| 6,533,700 B2 | 3/2003 | Shoge |
| D472,507 S | 4/2003 | Passarotto |
| D473,526 S | 4/2003 | Israel et al. |
| 6,553,861 B2 | 4/2003 | Ose |
| 6,557,331 B2 | 5/2003 | Busboom et al. |
| 6,557,671 B1 | 5/2003 | Kirimoto et al. |
| 6,559,564 B1 | 5/2003 | Itou |
| 6,564,671 B2 | 5/2003 | Ose |
| 6,568,767 B2 | 5/2003 | Meggiolan |
| 6,569,045 B1 | 5/2003 | Campagnolo |
| 6,572,508 B2 | 6/2003 | Shoge |
| 6,575,053 B2 | 6/2003 | Menzies |
| D476,551 S | 7/2003 | Bentley |
| 6,587,765 B2 | 7/2003 | Graham et al. |
| 6,588,474 B2 | 7/2003 | Passarotto |
| 6,595,487 B2 | 7/2003 | Johansen et al. |
| 6,595,894 B2 | 7/2003 | Hanatani |
| 6,597,166 B2 | 7/2003 | Meggiolan |
| 6,607,056 B2 | 8/2003 | Campagnolo |
| 6,607,457 B2 | 8/2003 | Kawakami |
| 6,607,465 B1 | 8/2003 | Shoge |
| 6,612,010 B2 | 9/2003 | Bekkekvold et al. |
| 6,619,154 B2 | 9/2003 | Campagnolo |
| 6,629,903 B1 | 10/2003 | Kondo |
| 6,634,971 B2 | 10/2003 | Campagnolo |
| 6,637,763 B2 | 10/2003 | Kuo |
| 6,640,938 B2 | 11/2003 | Shoge |
| 6,641,494 B1 | 11/2003 | Campagnolo |
| 6,641,495 B2 | 11/2003 | Valle |
| 6,641,500 B2 | 11/2003 | Shoge |
| 6,647,823 B2 | 11/2003 | Tsumiyama et al. |
| 6,648,782 B2 | 11/2003 | Valle |
| 6,662,677 B2 | 12/2003 | Rixon et al. |
| 6,664,518 B2 | 12/2003 | Fristedt |
| 6,668,529 B2 | 12/2003 | Busboom et al. |
| 6,669,220 B2 | 12/2003 | Meggiolan |
| 6,676,095 B2 | 1/2004 | Dal Pra |
| 6,676,554 B2 | 1/2004 | Dal Pra |
| 6,679,056 B2 | 1/2004 | Lenerand et al. |
| 6,679,797 B2 | 1/2004 | Valle |
| 6,684,982 B2 | 2/2004 | Kariyama |
| 6,685,586 B2 | 2/2004 | Dal Pra |
| 6,688,704 B2 | 2/2004 | Meggiolan |
| 6,691,591 B2 | 2/2004 | Tsumiyama et al. |
| 6,694,845 B2 | 2/2004 | Campagnolo |
| 6,695,745 B1 | 2/2004 | Bjorkgard |
| 6,695,868 B2 | 2/2004 | Looney et al. |
| 6,698,309 B2 | 3/2004 | Rixon et al. |
| 6,698,567 B2 | 3/2004 | Dal Pra |
| 6,709,066 B2 | 3/2004 | Passarotto |
| 6,714,153 B1 | 3/2004 | Kong et al. |
| 6,718,843 B2 | 4/2004 | Campagnolo |
| 6,718,844 B2 | 4/2004 | Hanatani |
| 6,719,057 B2 | 4/2004 | Johansen |
| 6,722,743 B2 | 4/2004 | Meggiolan |
| 6,725,740 B2 | 4/2004 | Dal Pra |
| 6,726,586 B2 | 4/2004 | Fukuda |
| 6,726,587 B2 | 4/2004 | Kawakami |
| 6,729,130 B1 | 5/2004 | Lilleland |
| 6,733,203 B2 | 5/2004 | Carlsen et al. |
| 6,737,956 B1 | 5/2004 | Kimura |
| 6,739,570 B2 | 5/2004 | Carlsen |
| 6,742,963 B2 | 6/2004 | Bekkevold et al. |

(56) References Cited

U.S. PATENT DOCUMENTS

| | | |
|---|---|---|
| 6,745,548 B1 | 6/2004 | Phillip et al. |
| 6,746,220 B2 | 6/2004 | Norheim |
| 6,748,637 B2 | 6/2004 | Meggiolan |
| 6,751,533 B2 | 6/2004 | Graham et al. |
| 6,757,567 B2 | 6/2004 | Campagnolo et al. |
| 6,761,847 B2 | 7/2004 | Meggiolan |
| 6,763,740 B1 | 7/2004 | Ose |
| 6,767,308 B2 | 7/2004 | Kitamura |
| 6,783,192 B2 | 8/2004 | Meggiolan |
| 6,792,671 B1 | 9/2004 | Oberg |
| 6,792,825 B2 | 9/2004 | Kawakami |
| 6,792,826 B2 | 9/2004 | Dal Pra |
| 6,793,045 B2 | 9/2004 | Matsueda |
| 6,796,392 B2 | 9/2004 | Kobayashi et al. |
| 6,803,007 B2 | 10/2004 | Meggiolan |
| 6,820,668 B2 | 11/2004 | Passarotto |
| 6,823,758 B2 | 11/2004 | Itou |
| 6,835,148 B2 | 12/2004 | Takebayashi et al. |
| 6,837,128 B2 | 1/2005 | Campagnolo |
| 6,837,341 B2 | 1/2005 | Matsueda |
| 6,837,815 B2 | 1/2005 | Meggiolan |
| 6,840,129 B2 | 1/2005 | Itou |
| 6,843,321 B2 | 1/2005 | Carlsen |
| 6,843,741 B2 | 1/2005 | Fujii |
| 6,848,336 B2 | 2/2005 | Shahana |
| 6,860,171 B1 | 3/2005 | Nanko et al. |
| 6,868,657 B2 | 3/2005 | Bauer et al. |
| 6,868,752 B2 | 3/2005 | Tetsuka et al. |
| 6,873,885 B2 | 3/2005 | Campagnolo et al. |
| 6,875,150 B2 | 4/2005 | Matsuo et al. |
| 6,877,393 B2 | 4/2005 | Takachi |
| 6,880,425 B2 | 4/2005 | Shahana |
| 6,883,625 B2 | 4/2005 | Trego et al. |
| 6,890,276 B2 | 5/2005 | Valle |
| 6,892,599 B2 | 5/2005 | Bjorkgard |
| 6,892,807 B2 | 5/2005 | Fristedt et al. |
| 6,893,486 B2 | 5/2005 | Sanderford et al. |
| 6,896,277 B2 | 5/2005 | Meggiolan |
| 6,899,649 B2 | 5/2005 | Ichida et al. |
| 6,905,131 B2 | 6/2005 | Horiuchi et al. |
| 6,913,119 B2 | 7/2005 | Matsueda |
| 6,914,217 B2 | 7/2005 | Fristedt |
| 6,923,355 B2 | 8/2005 | Campagnolo |
| 6,926,467 B1 | 8/2005 | Andersen et al. |
| 6,945,133 B2 | 9/2005 | Rush et al. |
| 6,951,092 B2 | 10/2005 | Busboom et al. |
| 6,962,358 B2 | 11/2005 | Bjorkgard |
| 6,963,146 B2 | 11/2005 | Zecca et al. |
| 6,964,518 B1 | 11/2005 | Jagtoyen |
| 6,965,817 B2 | 11/2005 | Graham et al. |
| 6,966,170 B2 | 11/2005 | Meggiolan |
| 6,968,926 B2 | 11/2005 | Matsueda |
| 6,978,867 B2 | 12/2005 | Matsueda |
| 6,986,723 B2 | 1/2006 | Valle |
| 6,988,739 B2 | 1/2006 | Guderzo et al. |
| 6,988,970 B2 | 1/2006 | Dal Pra |
| 6,992,413 B2 | 1/2006 | Endo et al. |
| 6,993,995 B2 | 2/2006 | Fujii |
| 7,000,499 B2 | 2/2006 | Valle |
| 7,003,935 B2 | 2/2006 | Nesheim |
| 7,009,387 B2 | 3/2006 | Guderzo |
| 7,011,590 B2 | 3/2006 | Ichida et al. |
| 7,011,592 B2 | 3/2006 | Shahana et al. |
| 7,013,753 B2 | 3/2006 | Valle |
| 7,017,440 B2 | 3/2006 | Campagnolo |
| 7,022,037 B2 | 4/2006 | Valle |
| 7,024,959 B2 | 4/2006 | Tetsuka et al. |
| 7,041,186 B2 | 5/2006 | Meggiolan |
| 7,042,123 B2 | 5/2006 | Kitamura et al. |
| 7,048,546 B2 | 5/2006 | Endo |
| 7,048,659 B2 | 5/2006 | Campagnolo |
| 7,052,504 B2 | 5/2006 | Hughett |
| 7,061,228 B2 | 6/2006 | Ichida et al. |
| 7,062,989 B2 | 6/2006 | Tsumiyama |
| 7,063,177 B1 | 6/2006 | Crumly |
| 7,066,558 B2 | 6/2006 | Meggiolan |
| 7,086,974 B2 | 8/2006 | Dal Pra |
| 7,090,602 B2 | 8/2006 | Tetsuka et al. |
| 7,100,471 B2 | 9/2006 | Irie et al. |
| 7,100,757 B2 | 9/2006 | Gunnerud et al. |
| 7,100,932 B2 | 9/2006 | Meggiolan |
| 7,117,891 B2 | 10/2006 | Magnus et al. |
| 7,121,968 B2 | 10/2006 | Campagnolo et al. |
| 7,131,258 B2 | 11/2006 | Meggiolan |
| 7,131,656 B2 | 11/2006 | Valle |
| 7,132,075 B2 | 11/2006 | Meggiolan |
| 7,134,715 B1 | 11/2006 | Fristedt et al. |
| 7,135,981 B1 | 11/2006 | Lafontaine |
| 7,137,639 B2 | 11/2006 | Meggiolan |
| 7,137,671 B2 | 11/2006 | Passarotto et al. |
| 7,140,695 B2 | 11/2006 | Passarotto |
| 7,142,955 B1 | 11/2006 | Kern et al. |
| 7,144,089 B2 | 12/2006 | Meggiolan |
| 7,146,874 B2 | 12/2006 | Shahana et al. |
| 7,148,582 B2 | 12/2006 | Matsueda et al. |
| 7,150,205 B2 | 12/2006 | Takachi |
| 7,152,498 B2 | 12/2006 | Shahana et al. |
| 7,159,881 B2 | 1/2007 | Guderzo et al. |
| 7,162,858 B2 | 1/2007 | Graham |
| 7,166,054 B2 | 1/2007 | Urabe |
| 7,178,239 B2 | 2/2007 | Meggiolan et al. |
| 7,178,322 B2 | 2/2007 | Osborne |
| 7,184,872 B2 | 2/2007 | Guderzo |
| D539,199 S | 3/2007 | Caiazzo |
| D539,712 S | 4/2007 | Caiazzo |
| D540,726 S | 4/2007 | Caiazzo |
| 7,200,447 B2 | 4/2007 | Campagnolo et al. |
| 7,207,911 B2 | 4/2007 | Campagnolo et al. |
| 7,213,662 B2 | 5/2007 | Crumly |
| 7,219,573 B2 | 5/2007 | Dal Pra |
| 7,221,265 B2 | 5/2007 | Bjorkgard |
| 7,223,189 B2 | 5/2007 | Guderzo et al. |
| D544,419 S | 6/2007 | Caiazzo |
| D545,736 S | 7/2007 | Caiazzo |
| 7,240,585 B2 | 7/2007 | Nanko et al. |
| 7,246,538 B2 | 7/2007 | Hermansson |
| 7,255,660 B2 | 8/2007 | Del Pra |
| 7,258,040 B2 | 8/2007 | Valle et al. |
| 7,258,402 B2 | 8/2007 | Meggiolan |
| 7,258,638 B2 | 8/2007 | Valle |
| 7,263,818 B2 | 9/2007 | Osborne |
| 7,267,026 B2 | 9/2007 | Tsumiyama et al. |
| 7,267,205 B2 | 9/2007 | Matsueda et al. |
| 7,273,105 B2 | 9/2007 | Johansen et al. |
| 7,273,258 B2 | 9/2007 | Meggiolan |
| D553,060 S | 10/2007 | Caiazzo |
| 7,275,615 B2 | 10/2007 | Derby, V et al. |
| 7,276,899 B2 | 10/2007 | Guderzo |
| 7,281,489 B2 | 10/2007 | Kawakami |
| 7,284,936 B1 | 10/2007 | Rinner |
| 7,290,465 B2 | 11/2007 | Gao et al. |
| 7,292,923 B2 | 11/2007 | Guderzo |
| 7,293,397 B2 | 11/2007 | Osborne |
| D557,653 S | 12/2007 | Meggiolan |
| 7,306,211 B2 | 12/2007 | Bjorkgard |
| 7,314,121 B2 | 1/2008 | Matsueda et al. |
| 7,315,274 B2 | 1/2008 | Fossum |
| 7,318,309 B2 | 1/2008 | Osborne |
| 7,331,638 B2 | 2/2008 | Passarotto |
| 7,335,070 B2 | 2/2008 | Yoda et al. |
| 7,340,975 B2 | 3/2008 | Kawakami |
| 7,340,976 B2 | 3/2008 | Tetsuka |
| 7,350,870 B2 | 4/2008 | Bates |
| 7,351,000 B2 | 4/2008 | Meggiolan |
| 7,354,114 B2 | 4/2008 | Passarotto et al. |
| 7,354,362 B2 | 4/2008 | Dal Pra |
| 7,369,929 B2 | 5/2008 | Guderzo |
| 7,373,232 B2 | 5/2008 | Guderzo |
| D570,207 S | 6/2008 | Cox et al. |
| 7,381,142 B2 | 6/2008 | Campagnolo |
| 7,382,235 B2 | 6/2008 | Guderzo |
| 7,383,103 B2 | 6/2008 | Guderzo et al. |
| 7,392,723 B2 | 7/2008 | Tsumiyama |
| 7,393,063 B2 | 7/2008 | Passarotto et al. |

(56) References Cited

U.S. PATENT DOCUMENTS

| | | |
|---|---|---|
| 7,400,138 B2 | 7/2008 | Hodin et al. |
| 7,401,627 B2 | 7/2008 | Magnus et al. |
| 7,405,540 B2 | 7/2008 | Lafontaine |
| 7,413,253 B2 | 8/2008 | Karlberg |
| 7,425,041 B2 | 9/2008 | Passarotto et al. |
| 7,427,108 B2 | 9/2008 | Hermansson et al. |
| 7,442,140 B2 | 10/2008 | Valle |
| 7,448,696 B2 | 11/2008 | Meggiolan et al. |
| 7,461,573 B2 | 12/2008 | Dal Pra et al. |
| 7,478,689 B1 | 1/2009 | Sugden et al. |
| 7,481,499 B2 | 1/2009 | Meggiolan |
| 7,491,143 B2 | 2/2009 | Valle |
| 7,523,600 B2 | 4/2009 | Sasaoka |
| 7,540,131 B2 | 6/2009 | Stover et al. |
| 7,540,216 B2 | 6/2009 | Campagnolo |
| 7,549,476 B2 | 6/2009 | Carlsen et al. |
| 7,553,247 B2 | 6/2009 | Guderzo et al. |
| D596,547 S | 7/2009 | Passarotto et al. |
| 7,560,905 B2 | 7/2009 | Lafontaine |
| 7,562,602 B2 | 7/2009 | Blascok et al. |
| 7,565,849 B2 | 7/2009 | Sauder, Jr. |
| 7,567,045 B2 | 7/2009 | Fristedt |
| 7,571,788 B2 | 8/2009 | Barnard |
| 7,587,958 B2 | 9/2009 | Gorman et al. |
| 7,591,126 B2 | 9/2009 | Cox |
| 7,607,369 B2 | 10/2009 | Cox et al. |
| 7,610,832 B2 | 11/2009 | Dal Pra |
| 7,614,319 B2 | 11/2009 | Hermansson et al. |
| 7,614,706 B2 | 11/2009 | Meggiolan et al. |
| 7,623,931 B2 | 11/2009 | Campagnolo et al. |
| 7,630,810 B2 | 12/2009 | Guderzo |
| 7,631,931 B2 | 12/2009 | Langensiepen |
| 7,631,944 B2 | 12/2009 | Meggiolan |
| 7,651,172 B2 | 1/2010 | Meggiolan |
| 7,651,654 B2 | 1/2010 | Meggiolan |
| 7,654,329 B2 | 2/2010 | Lindland et al. |
| 7,665,745 B2 | 2/2010 | Bjorkgard |
| 7,665,807 B2 | 2/2010 | Passarotto et al. |
| D612,223 S | 3/2010 | DePretto |
| 7,669,464 B2 | 3/2010 | Dankbaar |
| 7,698,881 B2 | 4/2010 | McCane et al. |
| 7,712,292 B2 | 5/2010 | Stover et al. |
| 7,712,826 B2 | 5/2010 | Josefsson |
| 7,726,739 B2 | 6/2010 | Wain |
| 7,730,577 B2 | 6/2010 | Wood |
| 7,735,936 B2 | 6/2010 | Passarotto et al. |
| 7,740,091 B2 | 6/2010 | Bartel |
| 7,748,790 B2 | 7/2010 | Meggiolan et al. |
| 7,749,119 B2 | 7/2010 | Meggiolan |
| 7,762,050 B1 | 7/2010 | Kaskawitz |
| 7,775,844 B2 | 8/2010 | St-Pierre et al. |
| 7,802,490 B2 | 9/2010 | Ingraham |
| 7,827,896 B2 | 11/2010 | Hektoen et al. |
| 7,849,926 B2 | 12/2010 | Inderberg |
| 7,850,555 B2 * | 12/2010 | Keane et al. .................... 474/19 |
| 7,850,556 B2 | 12/2010 | Meggiolan |
| 7,861,599 B2 | 1/2011 | Meggiolan |
| 7,866,045 B2 | 1/2011 | Meggiolan et al. |
| 7,866,697 B2 | 1/2011 | Norum et al. |
| 7,874,948 B2 | 1/2011 | Dal Pra |
| 7,886,947 B2 | 2/2011 | Campagnolo |
| 7,891,710 B2 | 2/2011 | Pedersen et al. |
| 7,891,713 B2 | 2/2011 | Bekkevold |
| 7,892,053 B2 | 2/2011 | St-Pierre et al. |
| 7,905,158 B2 | 3/2011 | Dal Pra et al. |
| 7,913,610 B2 | 3/2011 | Ulveraker et al. |
| 7,918,514 B2 | 4/2011 | Dal Pra |
| 7,933,163 B2 | 4/2011 | Fossum et al. |
| 7,938,039 B2 | 5/2011 | Cox |
| 7,967,392 B2 | 6/2011 | Meggiolan |
| 7,975,567 B2 | 7/2011 | Rapin et al. |
| 8,312,956 B2 | 11/2012 | Rindfleisch |
| 2002/0153179 A1 | 10/2002 | Kobayashi et al. |
| 2002/0183145 A1 * | 12/2002 | Blanchard .................... 474/19 |
| 2007/0169743 A1 | 7/2007 | Kobayashi et al. |
| 2007/0273152 A1 | 11/2007 | Kawakami et al. |
| 2007/0275821 A1 | 11/2007 | Kawakami et al. |
| 2009/0191992 A1 | 7/2009 | Osborne |
| 2011/0000175 A1 | 1/2011 | Lahey et al. |
| 2011/0000176 A1 | 1/2011 | Lahey et al. |
| 2011/0108335 A1 | 5/2011 | Levander et al. |

FOREIGN PATENT DOCUMENTS

| | | |
|---|---|---|
| EP | 1106046 A1 | 6/2001 |
| EP | 1252809 A2 | 10/2002 |
| EP | 1894456 A1 | 3/2008 |
| EP | 1902608 A2 | 3/2008 |
| EP | 2018798 A2 | 1/2009 |
| EP | 2025217 A1 | 2/2009 |
| EP | 2269437 A1 | 1/2011 |
| GB | 404439 | 1/1934 |
| GB | 1515013 | 6/1978 |
| JP | 2005088769 A | 4/2005 |
| WO | 98/10205 | 3/1998 |
| WO | 2010/002298 | 1/2010 |
| WO | 2012115543 | 8/2012 |

OTHER PUBLICATIONS

International Search Report and Written Opinion, dated Dec. 6, 2012, in corresponding PCT Application No. PCT/US2012/057174.

Craftsman Rotary Lawn Mower Model No. 917.371031 Manual, EZ Walk Drive Control Assembly, p. 9-10, 44, Dated Apr. 21, 2009.

Husqvarna HU775H Manual, Auto Walk Control System, pp. 6, 7, 10, 18, No Date.

International Preliminary Report on Patentability, dated Apr. 10, 2014, in corresponding PCT Application No. PCT/US2012/057174.

* cited by examiner

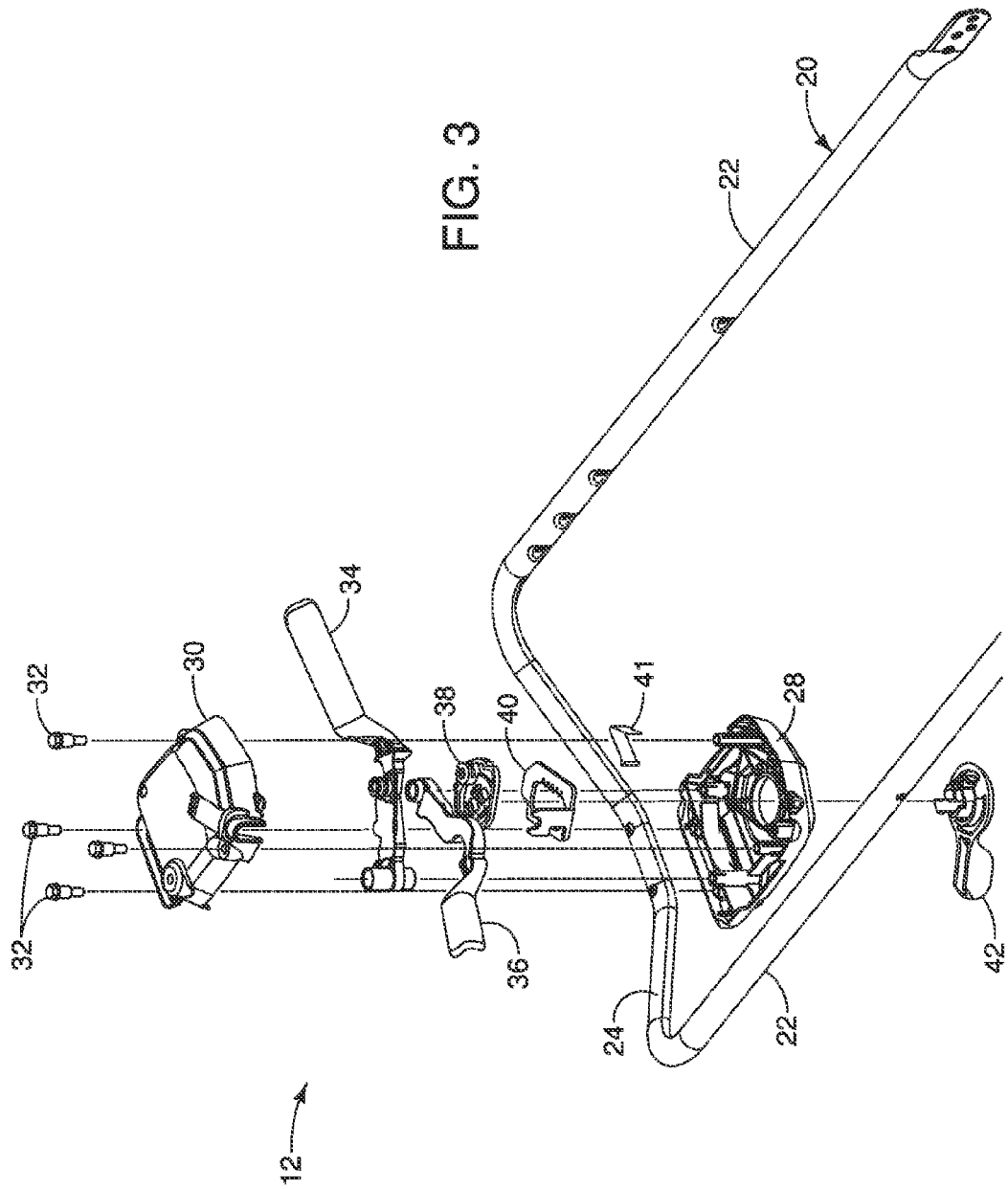

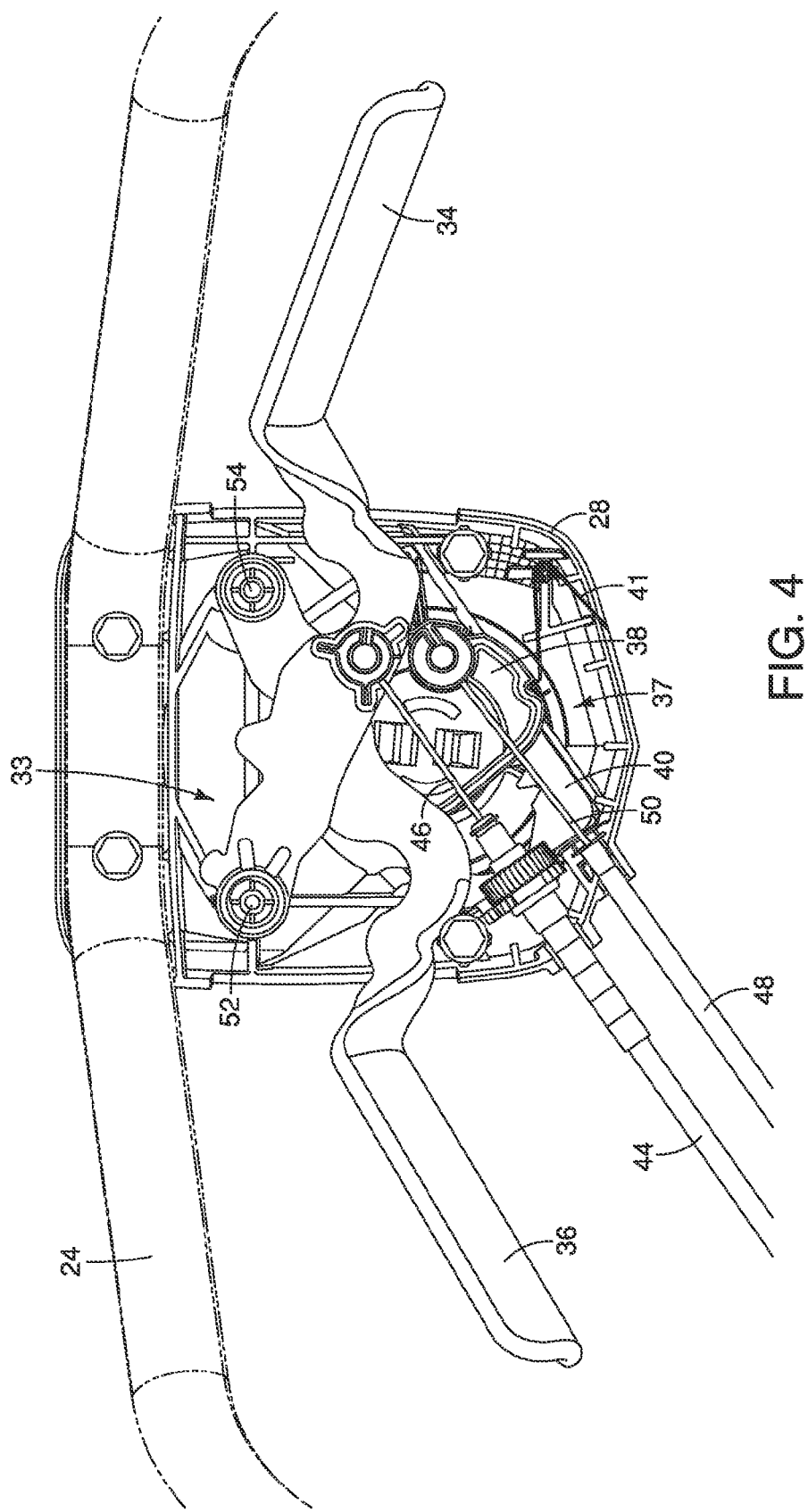

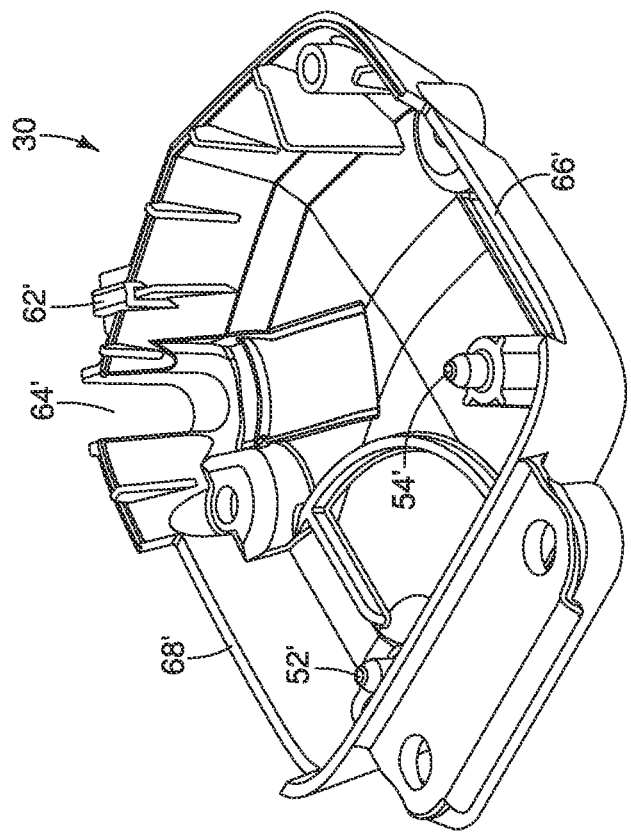
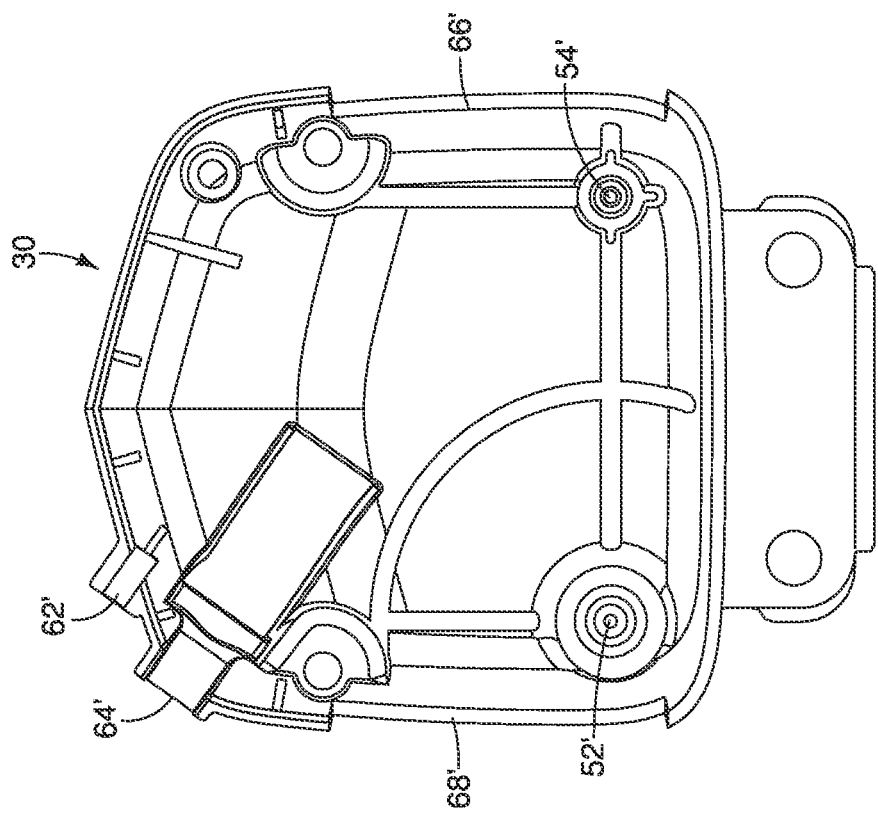

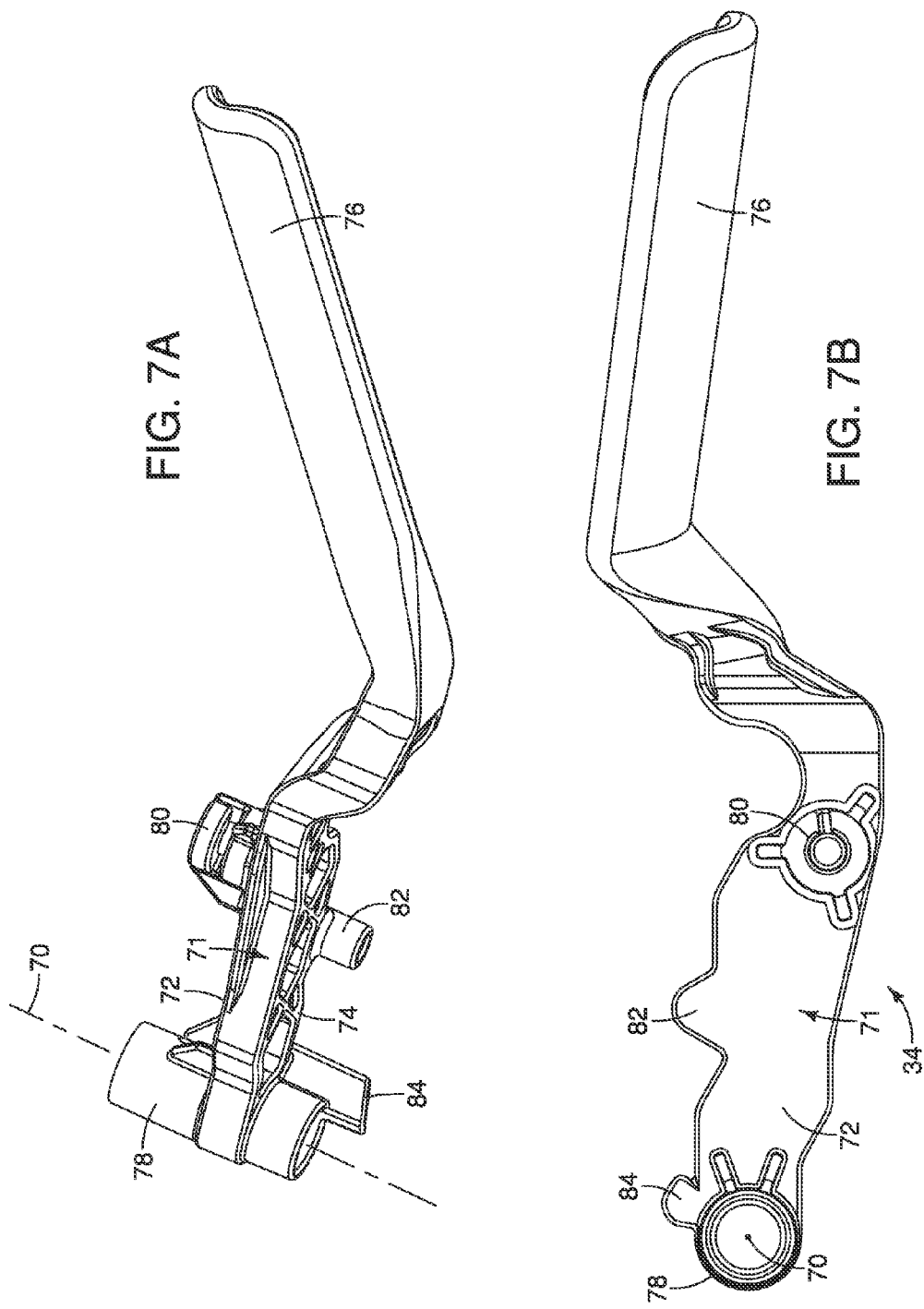

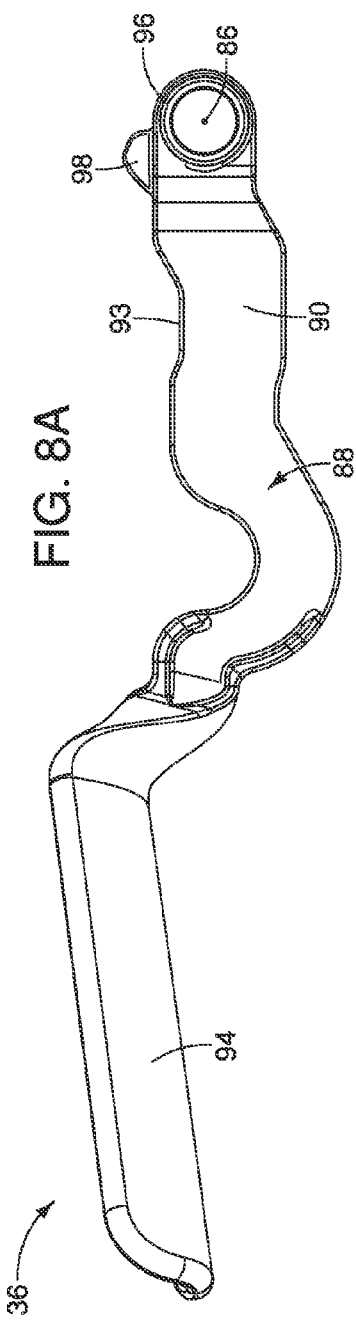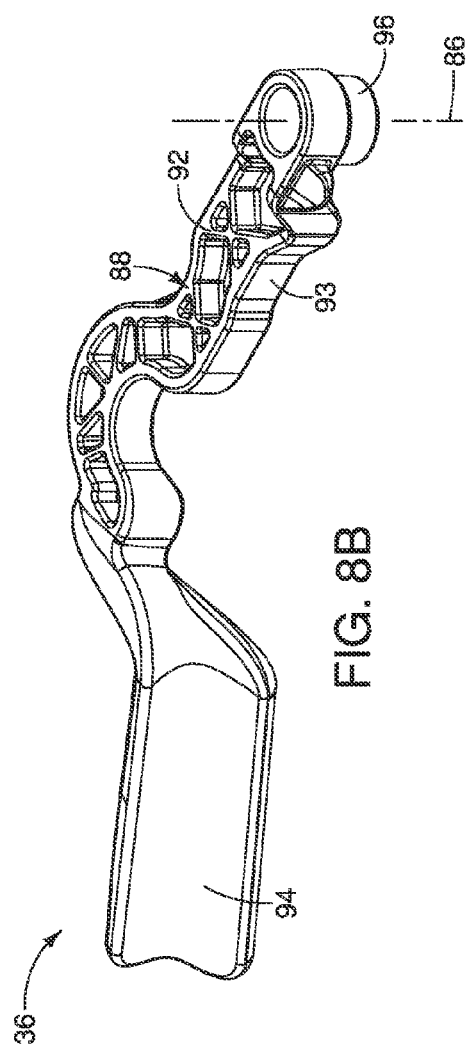

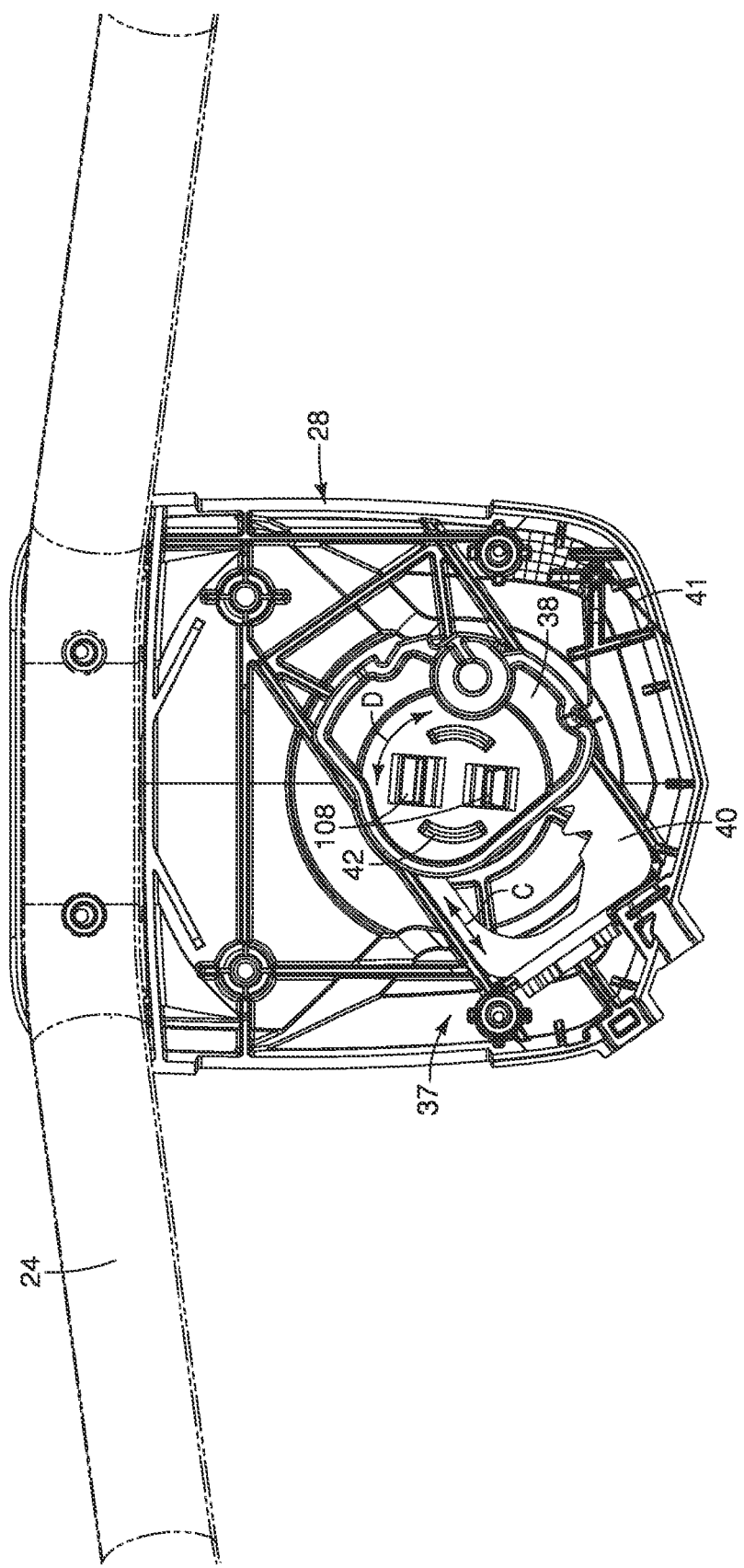

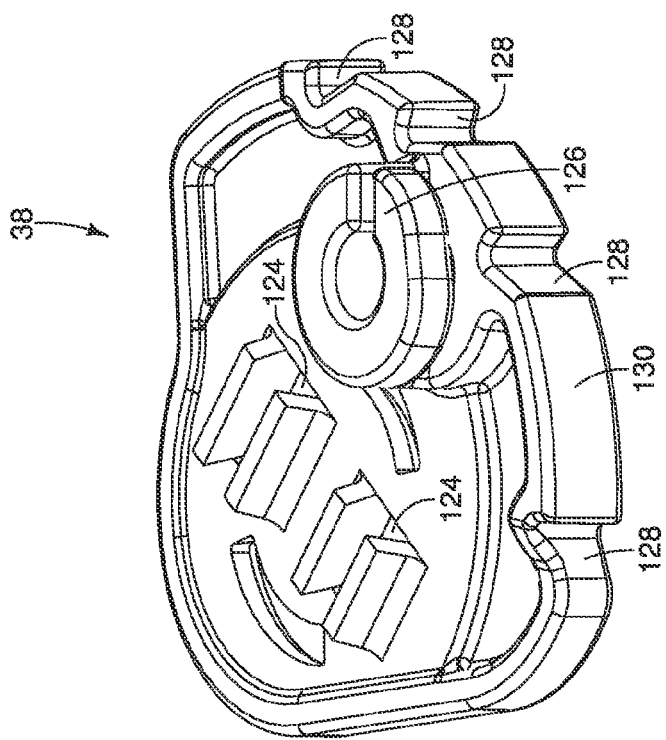
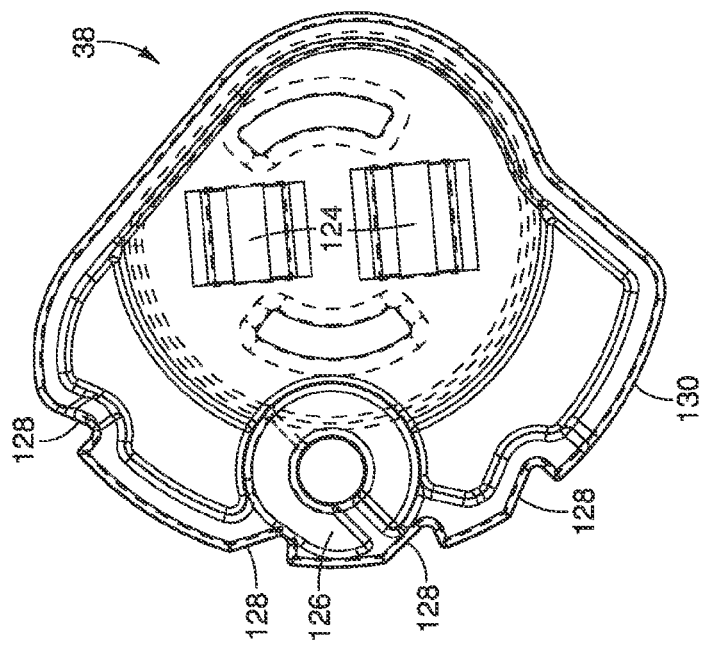
FIG. 12A
FIG. 12B

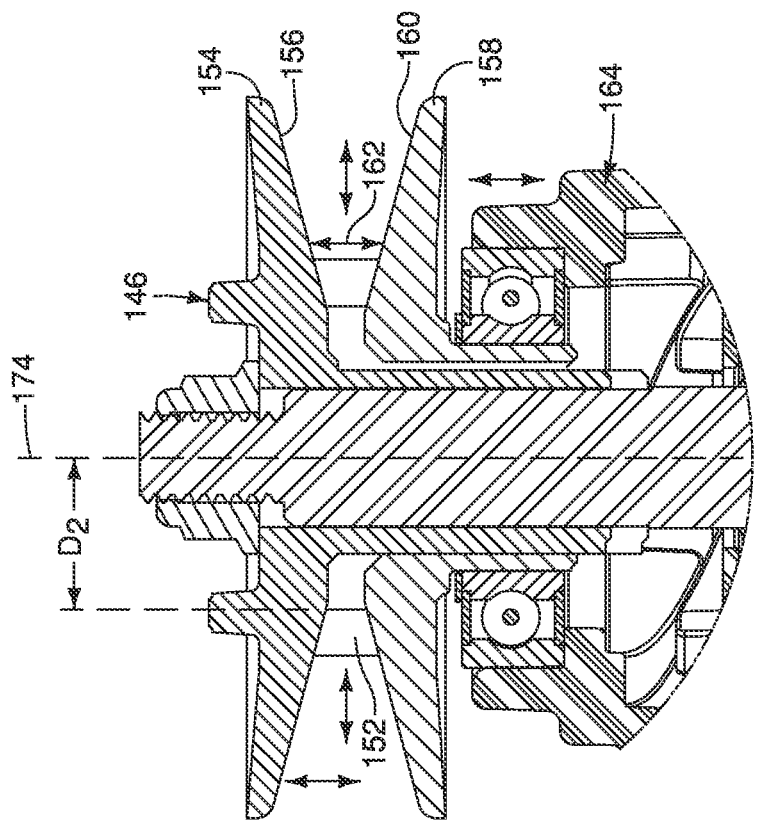
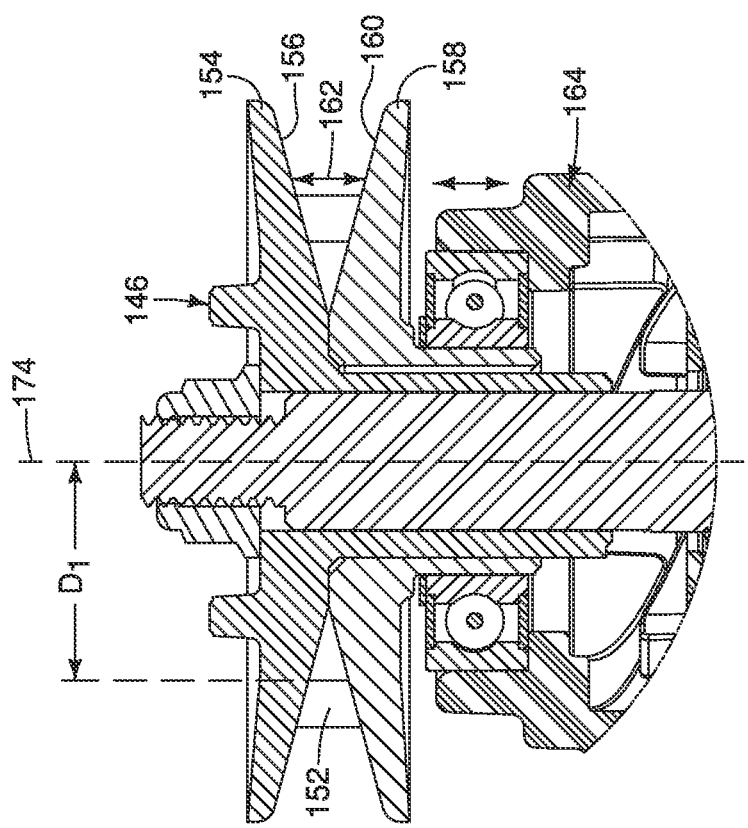

METHOD FOR CONTROLLING THE SPEED OF A SELF-PROPELLED WALK-BEHIND LAWN MOWER

CROSS-REFERENCE TO RELATED APPLICATIONS

The present application is a continuation application and claims the benefit of Ser. No. 13/250,209 filed on Sep. 30, 2011, which is hereby incorporated by reference in its entirety.

FIELD OF THE INVENTION

The present invention relates to walk-behind lawn mowers, and more particularly, to a variable speed transmission and control assembly for a self-propelled lawn mower.

BACKGROUND OF THE INVENTION

The propulsion of walk-behind lawn mowers has historically been operator-powered which required the operator to push the lawn mower around the yard. More recent walk-behind mowers have added self-propelled technology that typically includes a transmission that is powered by the primary engine, wherein the transmission is operatively connected to a pair of opposing wheels of the lawn mower to provide rotational power to those wheels so as to drive the mower. Generally, the self-propelled transmission is a single-speed transmission that is either engaged/on or disengaged/off. These single-speed self-propelled transmissions are typically controlled by an on/off switch or lever positioned on or near the cross-bar of the handle. These switches or levers may include, for example, a fore-aft adjustable lever on one leg of the handle, a rotatable bail that may operate independently or in conjunction with the safety bail, or a trigger-like mechanism, wherein actuation of the switches or levers causes the transmission to become engaged such that the transmission powers the wheels of the lawn mower.

These single-speed self-propelled transmission for a walk-behind mower are often difficult to effectively use by an operator for several reasons. For example, the speed generated by the transmission to the wheels may cause the lawn mower to travel at a speed that can be too fast or too slow for the operator. As such, if the propelled speed is too slow, the operator ends up providing the pushing force. On the other hand, if the propelled speed is too fast, the operator ends up being dragged along by the lawn mower. In either situation, transmission often cannot be optimized for each individual operator. Alternatively, when an operator approaches an object such as a tree, house, sidewalk, posts, or the like, the operator often desires to slow down to make turns or navigate the lawn mower around these obstacles, but the self-propelled transmission being engaged causes the lawn mower to proceed at the same speed which can make avoiding obstacles more difficult.

Therefore, a need exists for a multiple speed control mechanism for adjusting the speed of the self-propelled transmission between a plurality of different speeds. A need also exists for a convenient and ergonomic speed control assembly that allows independent actuation of the self-propelled transmission by either hand of the operator while also adjusting the speed level.

BRIEF SUMMARY OF THE INVENTION

In one aspect of the present invention, a speed control assembly for a self-propelled walk-behind lawn mower is provided. The speed control assembly includes a speed engagement assembly having a plurality of selectively rotatable levers. Rotation of at least one of the levers causes a transmission assembly of the lawn mower to actuate between an engaged position and a disengaged position. The speed control assembly also includes a speed adjustment assembly having a knob. The knob is selectively rotatable between a plurality of operative positions, wherein rotation between operative positions causes the transmission assembly to produce a different speed output corresponding to each operative position.

In another aspect of the present invention, a speed control assembly for a self-propelled walk-behind lawn mower is provided. The speed control assembly includes a casing, a first lever rotatably connected to the casing, a second lever rotatably connected to the casing, wherein rotation of at least one of the first and second levers actuates a self-propelled transmission assembly between an engaged position and a disengaged position, and a knob rotatably connected to the casing, wherein the knob is rotatable between a plurality of operative positions for adjusting the self-propelled transmission assembly between a plurality of speeds.

In yet another aspect of the present invention, a speed control assembly for a self-propelled walk-behind lawn mower is provided. The speed control assembly is operatively coupled to a transmission assembly that is selectively coupled to an engine by a belt. The speed control assembly includes a speed engagement assembly and a speed adjustment assembly. The speed engagement assembly includes a pair of levers rotatable connected to a casing. The speed engagement assembly also includes a first conduit, wherein one end of the first conduit is operatively connected to the pair of levers and an opposing end of the first conduit is operatively connected to the transmission assembly. Each of the pair of levers is rotatable between a disengaged position and an engaged position. The speed adjustment assembly includes a knob rotatably connected to the casing. The speed adjustment assembly also includes a cam positioned within the casing, the cam being attached to the knob, and wherein rotation of the knob causes corresponding rotation of the cam. The speed adjustment assembly further includes a second conduit, wherein one end of said second conduit is operatively connected to said cam and an opposing end of said second conduit is operatively connected to a first pulley of said transmission assembly, said first pulley being selectively coupled to the engine by the belt. Rotation of at least one of the levers causes the transmission assembly to actuate between a disengaged position and an engaged position with respect to the engine, and rotation of the knob causes the transmission assembly to generate a different output rotational speed.

Advantages of the present invention will become more apparent to those skilled in the art from the following description of the embodiments of the invention which have been shown and described by way of illustration. As will be realized, the invention is capable of other and different embodiments, and its details are capable of modification in various respects.

BRIEF DESCRIPTION OF SEVERAL VIEWS OF THE DRAWINGS

These and other features of the present invention, and their advantages, are illustrated specifically in embodiments of the invention now to be described, by way of example, with reference to the accompanying diagrammatic drawings, in which:

FIG. 3 is an exploded view of the speed control assembly shown in FIG. 2;

FIG. 4 is a bottom view of a portion of the speed control assembly shown in FIG. 2;

FIG. 6A is a top view of a lower housing;

FIG. 6B is a perspective view of the lower housing shown in FIG. 6A;

FIG. 7A is a perspective view of a first lever;

FIG. 7B is a plan view of the first lever shown in FIG. 7A;

FIG. 8A is a plan view of a second lever;

FIG. 8B is a perspective view of the second lever shown in FIG. 8A;

FIG. 9 is a top view of a speed adjustment assembly;

FIG. 12A is a plan view of a cam;

FIG. 12B is a perspective view of the cam shown in FIG. 12A;

FIG. 14A is a cross-sectional diagram of a portion of the transmission assembly shown in FIG. 13A in a first operative position; and FIG. 14B is a cross-sectional diagram of a portion of the transmission assembly shown in FIG. 14A in a second operative position.

Figure 1:
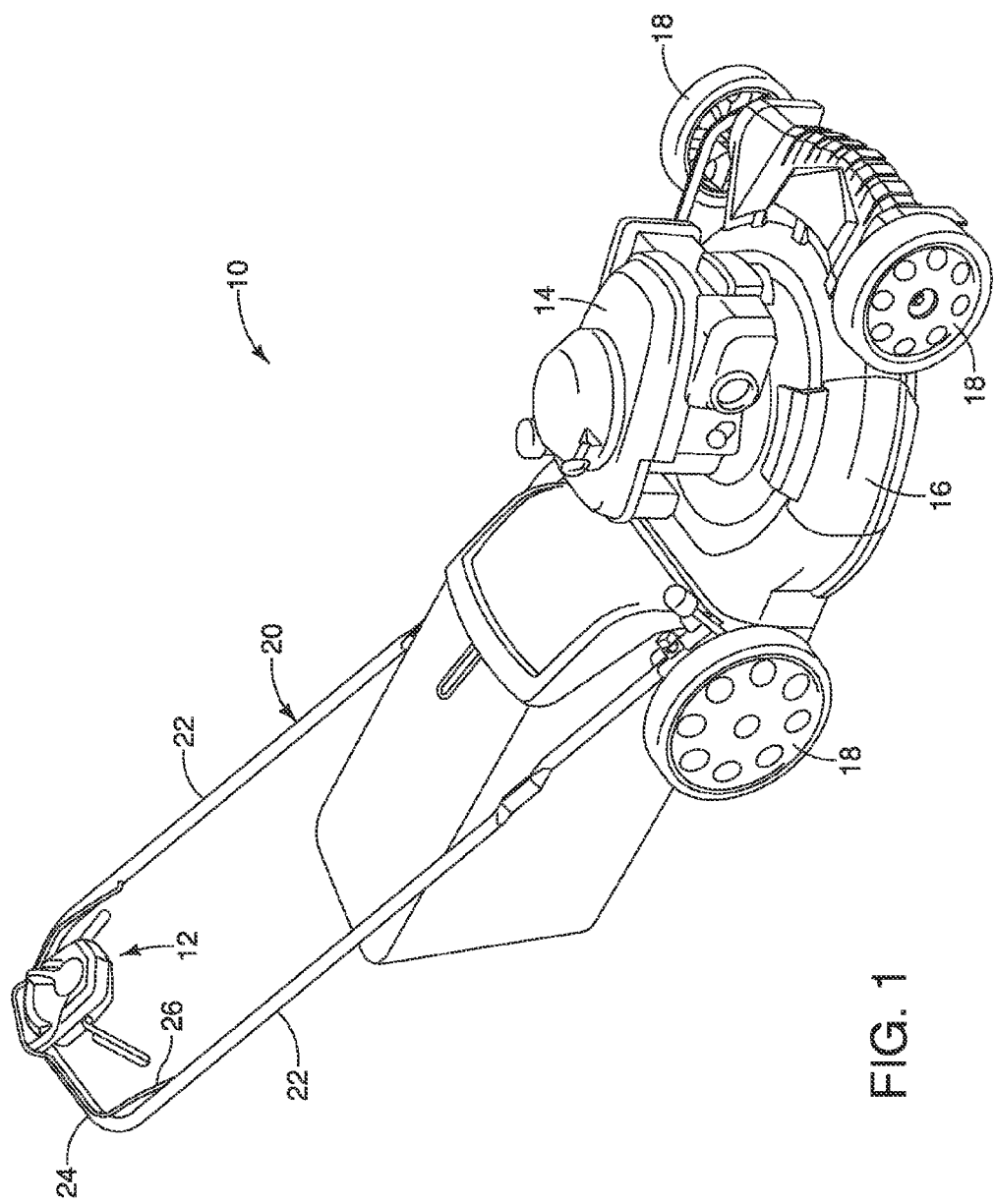
FIG. 1 is a perspective view of an embodiment of a self-propelled walk-behind lawn mower with a speed control assembly.

It should be noted that all the drawings are diagrammatic and not drawn to scale. Relative dimensions and proportions of parts of these figures have been shown exaggerated or reduced in size for the sake of clarity and convenience in the drawings. The same reference numbers are generally used to refer to corresponding or similar features in the different embodiments. Accordingly, the drawing(s) and description are to be regarded as illustrative in nature and not as restrictive.

DETAILED DESCRIPTION OF THE PREFERRED EMBODIMENT

Referring to FIG. 1, an exemplary embodiment of a self-propelled walk-behind lawn mower 10 having a speed control assembly 12 attached thereto is shown. The lawn mower 10 includes an engine 14 that powers a rotating blade assembly (not shown) for cutting grass, and the engine 14 is mounted on a deck or platform 16. A plurality of wheels 18 are attached to the deck 16, and at least a pair of the wheels 18 are configured to be selectively self-propelled by a transmission assembly, as will be described below.

A handle 20 extends from the rear portion of the deck 16, and the handle 20 includes a pair of elongated and substantially parallel side legs 22 having a cross bar 24 extending between the side legs 22, as shown in FIG. 1. In an embodiment, a safety bail 26 is rotatably connected to the opposing side legs 22 and is rotatable between a first position and a second position, wherein when the safety bail 26 is in the second position the engine can be started and remain running.

Figure 2:
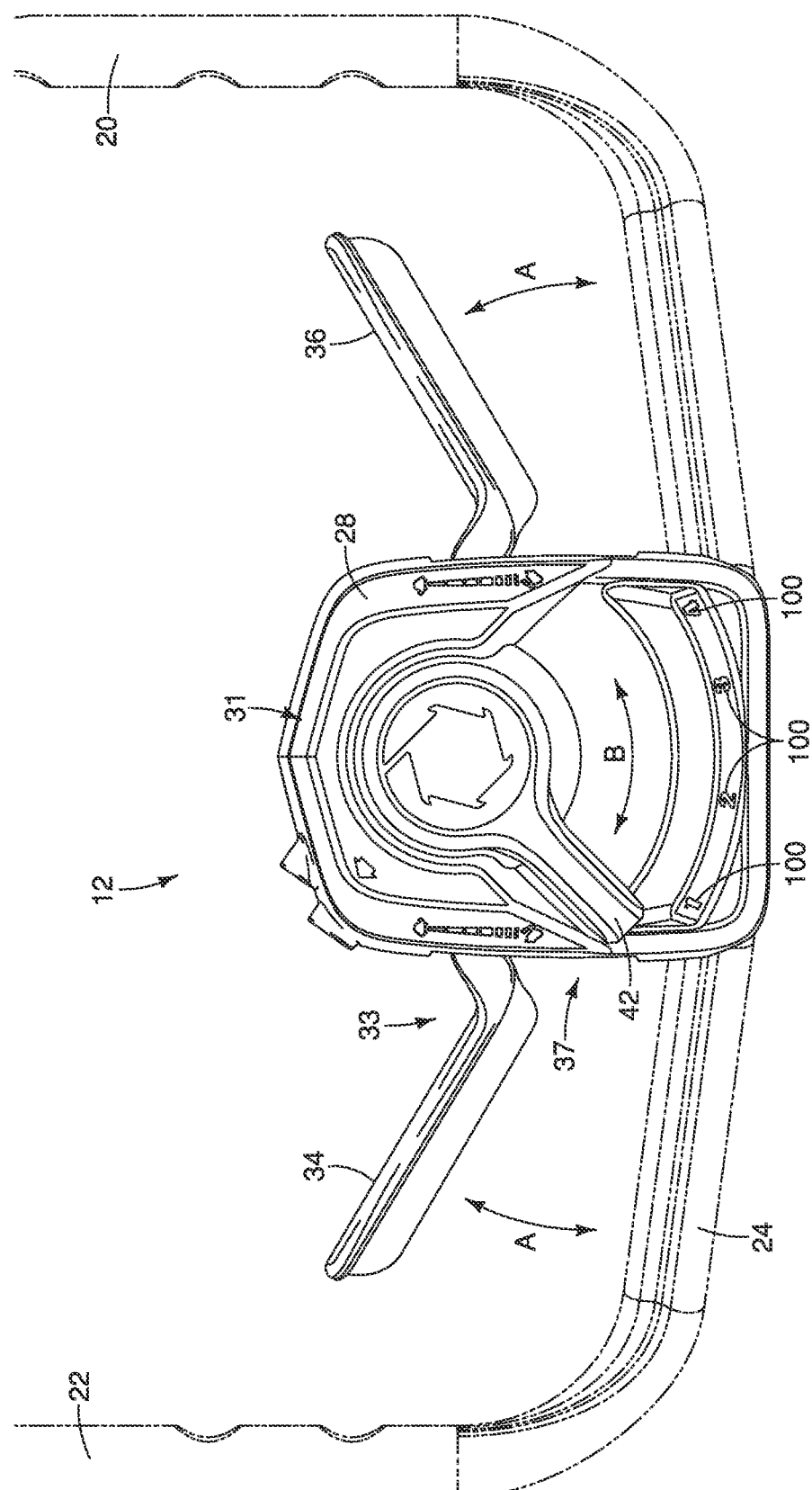
FIG. 2 is a top view of an embodiment of a speed control assembly.

FIGS. 2-3 illustrate an exemplary embodiment of the speed control assembly 12. The speed control assembly 12 is operatively connected to the cross bar 24 of the handle 20. In an embodiment, the speed control assembly 12 includes an upper housing 28 and a lower housing 30 which are both attachable to each other to form a casing 31 that surrounds a portion of the cross bar 24. A plurality of attachment mechanisms 32, such as bolts, screws, or the like, are inserted through apertures or bosses formed in the lower housing 30, passing through holes in the cross bar 24, and received in corresponding apertures or bosses formed in the upper housing 28 to secure the upper and lower housing 28, 30 together while also attaching the entire speed control assembly 12 to the handle 20. The upper and lower housings 28, 30 are attached to the handle 20 in fixed manner such that the casing 31 does not move or rotate relative to the cross bar 24.

FIGS. 2-4 illustrate an exemplary embodiment of a speed control assembly 12 that includes a speed engagement assembly 33 and a speed adjustment assembly 37. The speed engagement assembly 33 includes a first lever 34 and a second lever 36 for selectively actuating the transmission assembly between an engaged state and a disengaged state. The speed adjustment assembly 37 includes a cam 38, an indexer 40, an indexing spring 41, and a knob 42, wherein the knob 42 is rotatable to selectively switch the output speed of the transmission assembly between a plurality of different relative speeds when the transmission assembly is in the engaged state. The first and second levers 34, 36 are configured to be rotatable relative to the upper and lower housings 28, 30 for engaging and disengaging the transmission assembly, as will be discussed below. In particular, the first and second levers 34, 36 are rotatable in the direction indicated by the arrows A shown in FIG. 2. The knob 42 is likewise rotatable relative to the upper housing 28 to adjust the relative output speed of the transmission assembly, as will be discussed below. In particular, the knob 42 is rotatable in the direction indicated by the arrow B shown in FIG. 2. The knob 42 is shown and described in the exemplary embodiment of the speed adjustment assembly 37 as the mechanism for switching the transmission assembly between different speeds, but it should be understood by one of ordinary skill in the art that any other switching mechanism, such as a lever, toggle, slide bar, button(s), or the like can also be used as the switching mechanism, and the term "knob" will be used as a general term to represent any type of switching mechanism.

Figure 5B:
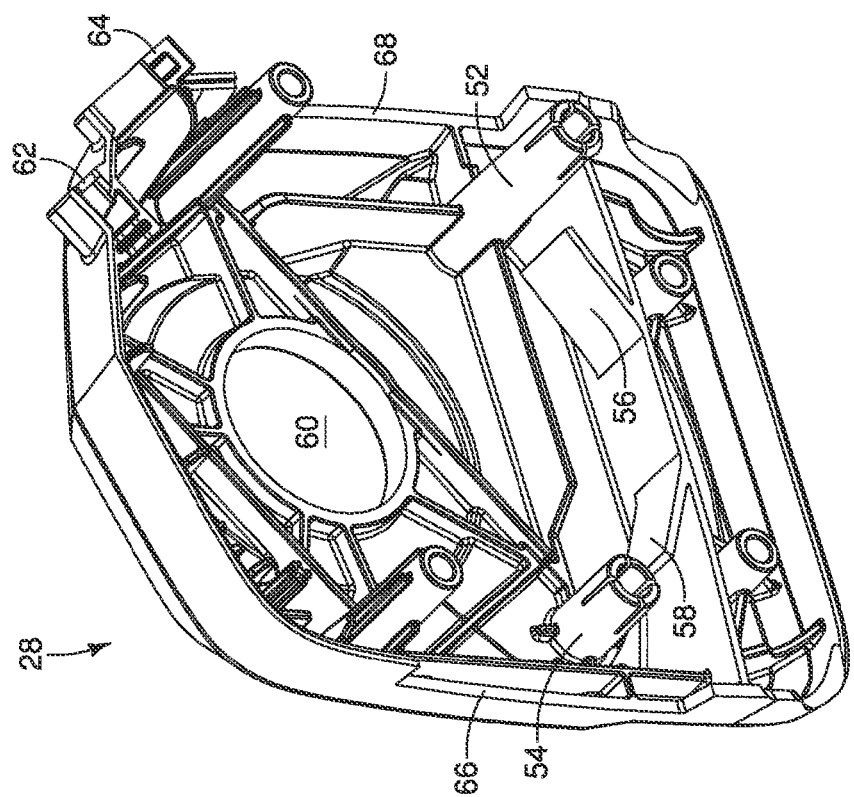
FIG. 5B is a perspective view of the upper housing shown in FIG. 5A.
Figure 5A:
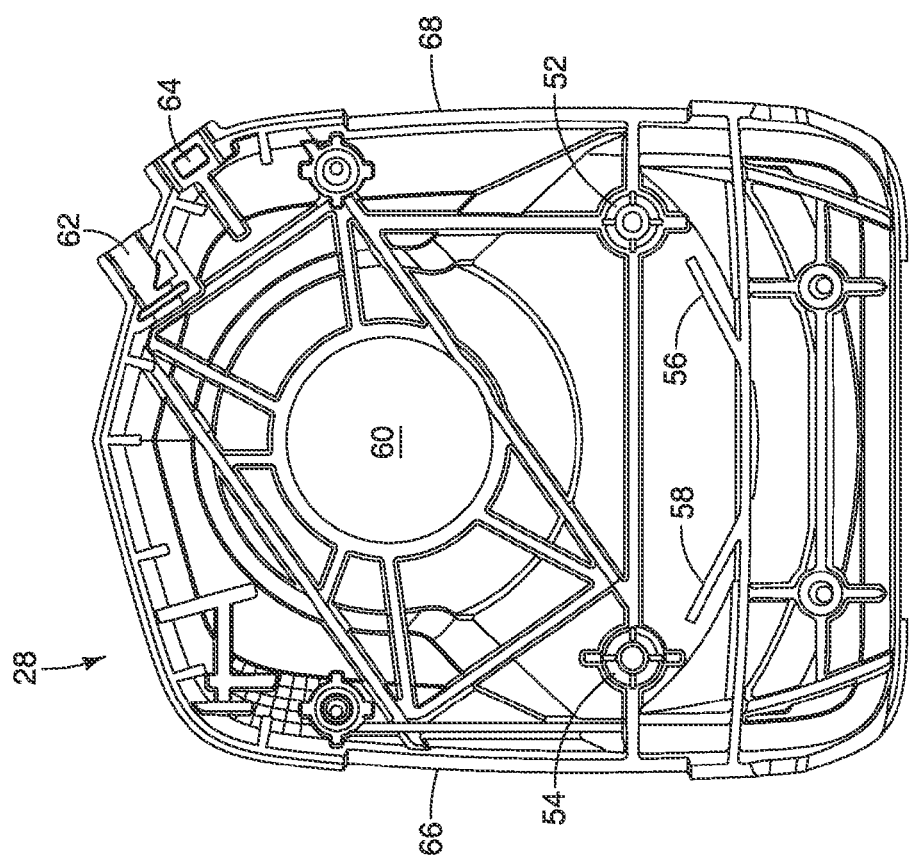
FIG. 5A is a bottom view of an upper housing.

FIGS. 5A-5B illustrate an exemplary embodiment of an upper housing 28. The upper housing 28 includes a first projection 52, a second projection 54, a first spring 56, a second spring 58, an aperture 60, a first conduit outlet 62, a second conduit outlet 64, a first slot 66, and a second slot 68. The first and second projections 52, 54 are elongated members that extend from the upper housing 28 and are configured to be operatively connected to the first and second levers 34, 36, respectively. The first and second springs 56, 58 are cantilevered projections that extend from the upper housing 28 and are configured to bias the first and second levers 34, 36 toward a first operative position, or a disengaged position, in which the first and second levers 34, 36 are spaced-apart from the cross bar 24. The first and second springs 56, 58 are integrally formed with the upper housing 28. The aperture 60 formed into the upper housing 28 is configured to receive the knob 42 that adjusts the speed of the transmission assembly when rotated. The first and second conduit outlets 62, 64 are configured to receive the first and second conduits 44, 48. The end of the first conduit 44 is attached to the indexer 40 and the end of the first wire 46 is attached to the first lever 34, whereas the end of the second conduit 48 is fixedly attached to the casing 31 and the end of the second wire 50 is attached to the cam 38. The first and second slots 66, 68 are formed in the side edges of the upper housing 28 to allow the first and second levers 34, 36 to extend laterally outward from the casing 31 through these slots.

The lower housing 30, as shown in FIGS. 6A-6B, is attachable to the upper housing 28 to form the casing 31 of the speed control assembly 12 that is attachable to the handle 20. The lower housing 30 includes a first slot 66', a second slot 68', a first projection 52', a second projection 54', a first conduit outlet 62', and a second conduit outlet 64'. The first and second slots 66', 68' of the lower housing 30 cooperate with the corresponding first and second slots 66, 68 of the upper housing 28 to provide a hole or aperture through both opposing side edges of the assembled casing 31 to allow the first and second levers 34, 36 to extend therefrom and rotate relative thereto. The first and second projections 52', 54' of the lower housing 30 are received within the ends of corresponding first and second projections 52, 54 of the upper housing 28, respectively, when the upper and lower housings 28, 30 are assembled to form the casing 31. The first and second conduit outlets 62', 64' of the lower housing 30 cooperate with the corresponding first and second conduit outlets 62, 64 of the upper housing 28 to receive the first and second conduits 44, 48 therein. In an embodiment, the upper and lower housings 28, 30 are molded plastic members that are attachable to each other to form the casing 31 of the speed control assembly 12. It should be understood by one of ordinary skill in the art that the upper and lower housings 28, 30 can be formed of any material sufficient to provide the necessary structural elements for receiving the components positioned therewithin.

In an embodiment, the first lever 34 of the speed control assembly 12 is an elongated member that is rotatable relative to the casing 31 about a first axis 70, as shown in FIGS. 7A-7B. The first lever 34 is both independently and dependently actuatable relative to the casing 31. The first lever 34 can be formed of molded plastic, metal, or any other material sufficient to withstand repeated gripping actuation by an operator as well as the environmental conditions during use as well as during off-season storage. The first lever 34 includes a central body 71 having a lower surface 72, an upper surface 74, and a grip 76 extending from the central body 71 as well as an attachment boss 78, a first boss 80, an actuator 82, and a first positioning member 84. The first lever 34 is operatively connected to the upper housing 28 by positioning the attachment boss 78 of the first lever 34 about the first projection 52 (FIG. 4). The attachment boss 78 is an elongated, substantially cylindrical member that extends away from both the lower and upper surfaces 72, 74 of the first lever 34. The attachment boss 78 forms a hollow passageway that is sized and shaped to correspond to the outer surface of the first projection 52 of the upper housing 28 such that the first lever 34 forms a fit with the upper housing 28 while still being able to rotate about the first axis 70.

The grip 76 of the first lever 34 extends from the end of the central body 71 opposite the attachment boss 78, as shown in FIGS. 7A-7B. The grip 76 forms a curved portion, wherein the curved inner surface of the grip 76 has a shape that corresponds to the shape of the cross bar 24 of the handle 20 such that when an operator actuates the first lever 34 the curved inner surface can be positioned immediately adjacent to or abutting the cross bar 24. The first lever 34 is configured such that the grip 76 extends laterally from the casing 31 through the first slot 66.

As illustrated in FIGS. 7A-7B, the first boss 80 extends from the lower surface 72 of the central body 71. The first boss 80 is a substantially cylindrical member configured to receive one end of the first wire 46. The distance between the first boss 80 and the attachment boss 78 remains constant such that rotation of the first lever 34 causes the first boss 80 to move relative to the end of the first conduit 44, wherein movement of the first boss 80 relative to the end of the first conduit 44 results in the first wire 46 to either extend from or retract into the first conduit 44.

The actuator 82 extends away from the upper surface 74 of the central body 71 of the first lever 34, as shown in FIGS. 7A-7B. The actuator 82 is formed as a substantially cylindrical member, but it should be understood by one of ordinary skill in the art that the actuator 82 can be sized and shaped in any manner. The actuator 82 is configured to contact the second lever 36, wherein the first lever 34 is rotated in response to actuation or rotation of the second lever 36 resulting from a camming action due to the contact between the actuator 82 and the second lever 36.

The first positioning member 84 of the first lever 34 extends from the central body 71 in a manner that is away from the upper surface 74, as shown in FIGS. 7A-7B. The first positioning member 84 cooperates with the first spring 56 of the upper housing 28 to bias the first lever 34 away from the cross bar 24 of the handle 20. The first positioning member 84 remains in substantially continuous contact with the first spring 56 that is integrally formed with the upper housing 28.

The second lever 36 is positioned between the first lever 34 and the upper housing 28, as shown in FIGS. 3-4. The second lever 36 of the speed control assembly 12 is an elongated member that is rotatable relative to the casing 31 about a second axis 86, as shown in FIGS. 8A-8B. The illustrated embodiment of the second lever 36 can be formed of molded plastic, metal, or any other material sufficient to withstand repeated gripping actuation by an operator as well as the environmental conditions during use as well as during off-season storage. The second lever 36 includes a central body 88 having an upper surface 90, a lower surface 92, and a cam surface 93, and a grip 94 extending from the central body 88, an attachment boss 96, and a second positioning member 98. The second lever 36 is operatively connected to the upper housing 28 by positioning the attachment boss 96 of the second lever 36 about the second projection 54 (FIG. 4). The attachment boss 96 is an elongated, substantially cylindrical member that extends away from the upper surfaces 90 of the central body 88. The attachment boss 96 forms a hollow passageway that is sized and shaped to correspond to the outer surface of the second projection 54 of the upper housing 28 such that the second lever 36 forms a fit with the upper housing 28 while still being able to rotate about the second axis 86.

The grip 94 of the second lever 36 extends from the end of the central body 88 opposite the attachment boss 96, as shown in FIGS. 8A-8B. The grip 94 forms a curved portion, wherein the curved inner surface of the grip 94 has a shape that corresponds to the shape of the cross bar 24 of the handle 20 such that when an operator actuates the second lever 36 the curved inner surface can be positioned immediately adjacent to or abutting the cross bar 24. The second lever 36 is configured such that the grip 94 extends laterally from the casing 31 through the second slot 68 opposite the first lever 34.

The cam surface 93 extends between the upper and lower surfaces 90, 92 of the central body 88 of the second lever 36, as shown in FIGS. 8A-8B. The cam surface 93 is configured to contact the actuator 82 of the first lever 34 such that actuation or rotation of the second lever 36 toward the cross bar 24 causes the actuator 82 of the first lever 34 to slide along the cam surface 93 of the second lever 36, thereby resulting in corresponding actuation or rotation of the first lever 34. Accordingly, the first lever 34 is also dependently rotatable relative to the casing 31 when the second lever 36 is rotated toward the handle 20.

The second positioning member 98 of the second lever 36 extends from the central body 88 in an adjacent manner, as shown in FIGS. 8A-8B. The second positioning member 98 cooperates with the second spring 58 (FIGS. 4-5B) of the upper housing 28 to bias the second lever 36 away from the cross bar 24 of the handle 20. The second positioning member 98 remains in substantially continuous contact with the second spring 58 that is integrally formed with the upper housing 28.

FIG. 9 illustrates an embodiment of a speed adjustment assembly 37 that is configured to selectively control the relative speed of the lawn mower 10. The speed adjustment assembly 37 includes the rotatable knob 42 (FIG. 2) that is operatively connected to the cam 38 which is connected to the second wire 50. The knob 42 is also operatively connected to the indexer 40 in a rack-and-pinion-type connection in which rotational movement of the knob 42 is converted into translational movement of the indexer 40. The indexer 40 is operatively connected to the first conduit 44 for adjusting the relative position of the end of the first conduit 44 with respect to the casing 31.

Figure 10B:
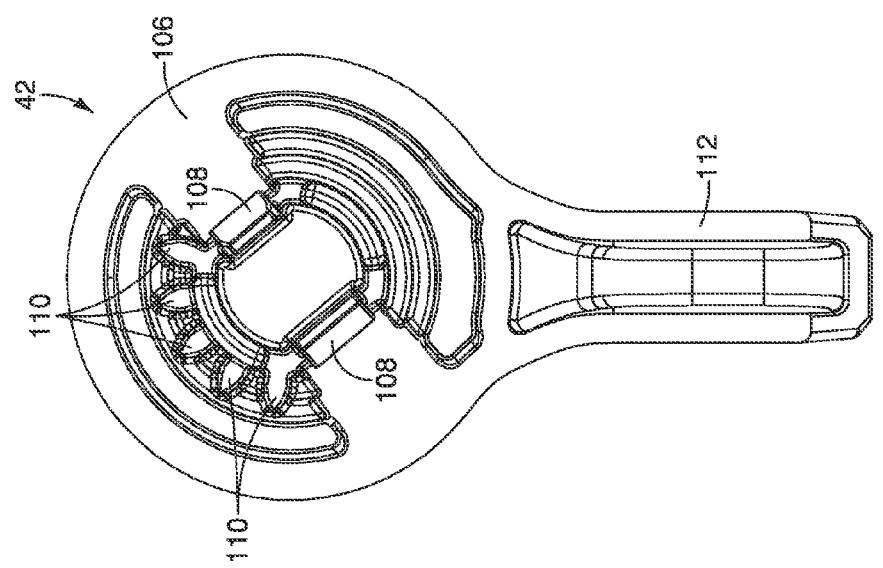
FIG. 10B is a plan view of the knob shown in FIG. 10A.
Figure 10A:
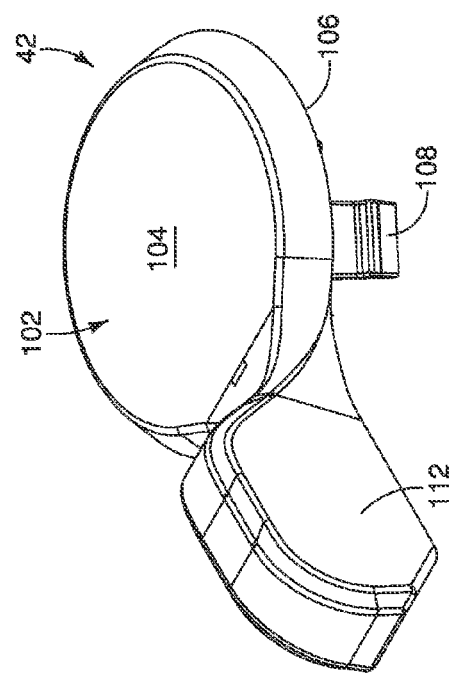
FIG. 10A is a perspective view of a knob.

With reference to FIGS. 10A-10B, an exemplary embodiment of a knob 42 of the speed adjustment assembly 37 is shown. In an embodiment, the knob 42 is formed of molded plastic. The knob 42 includes a substantially round central body 102 having a top surface 104 and a bottom surface 106. The knob 42 is positioned relative to the casing 31 such that the top surface 104 is directed away from the upper housing 28 (FIG. 2), and the bottom surface 106 is positioned immediately adjacent to the upper housing 28. In an embodiment, a pair of tabs 108 extend from the bottom surface 106. The tabs 108 are configured to couple the knob 42 to the cam 38. In another embodiment, three tabs 108 extend from the bottom surface 106 of the knob for coupling the knob 42 to the cam 38. It should be understood by one of ordinary skill in the art that any number of tabs 108 can extend from the bottom surface 106 to provide a coupling mechanism between the knob 42 and the cam 38. In yet another embodiment, the knob 42 and the cam 38 can be integrally formed as a single member.

In addition to the tabs 108, a plurality of indexing pins 110 extending from the bottom surface 106 of the knob 42, as shown in FIG. 10B. The indexing pins 110 are positioned between the tabs 108. The indexing pins 110 are positioned adjacent to each other in an arcuate alignment and are directed radially outward from the center of the central body 102 of the knob 42. In an embodiment, the knob 42 includes five (5) indexing pins 110, but it should be understood by one of ordinary skill in the art that the knob 42 may include any number of indexing pins 110. The five indexing pins 110 are positioned such that each indexing pin 110 is oriented between about 2°-45° relative to the adjacent indexing pin 110. In an embodiment, the indexing pins 110 are oriented about 24° relative to the adjacent indexing pin 110. It should be understood to one of ordinary skill in the art that the indexing pins 110 can be oriented at any angle relative to each other so as to provide a pinion-like engagement with the rack 116 (FIG. 11) of the indexer 40.

As illustrated in FIGS. 10A-10B, a grip 112 extends from the central body 102 of the knob 42. The grip 112 aligned radially outward from the central body 102, which allows an operator to grasp the grip 112 and rotate the knob 42 relative to the casing 31 wherein such rotation selectively changes the relative speed of the transmission assembly 140 (FIGS. 13A-14B). The speed control assembly 12 is configured such that the range of movement of the grip 112 of the knob 42 is between about 45°-180°. In an embodiment, the grip 112 is rotatable between a plurality of operative positions, as will be explained below. In another embodiment, the grip 112 is rotatable between an infinite quantity of operative positions. Rotational motion of the knob 42 generates translational motion of the indexer 40.

Figure 11:
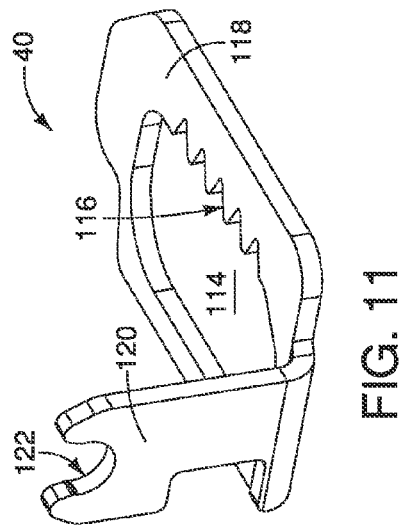
FIG. 11 is a perspective view of an indexer.

An exemplary embodiment of an indexer 40 of the speed adjustment assembly 37 is illustrated in FIG. 11. In an embodiment, the indexer 40 is formed of metal. However, it should be understood by one of ordinary skill in the art that the indexer 40 can be formed of any material sufficient to provide low friction between the indexer 40 and the upper housing 28 as well as between the indexer 40 and the cam 38. The indexer 40 is an L-shaped member that is positioned between the cam 38 and the upper housing 28. The indexer 40 includes an aperture 114 that forms a rack 116 in the base 118. The rack 116 includes a plurality of projections and indentations, wherein the quantity of indentations should be at least the same quantity of indexing pins 110 formed on the knob 42. In the exemplary embodiment, the rack 116 includes four (4) projections and five (5) indentations. When assembled, the indentations of the rack 116 are configured to receive a corresponding indexing pin 110 of the knob 42.

The illustrated embodiment of the indexer 40, as shown in FIG. 11, includes an arm 120 extending from the base 118 at an angle relative thereto. In an embodiment, the arm 120 is oriented substantially perpendicular relative to the base 118. In another embodiment the arm 120 is oriented at a non-normal angle relative to the base 118. A catch 122 is positioned at the end of the arm 120 opposite the base 118. The catch 122 is a detent, or cut-out, formed at the end of the arm 120 configured to receive an end of the first conduit 44. The end of the first conduit 44 received in the catch 122 may be formed as a z-fitting, a barrel fitting, a spherical fitting, or any other fitting sufficient to allow the end of the first conduit 44 be received by the catch 122. The indexer 40 is configured to translate in a substantially linear motion, as indicated by arrow C in FIG. 9. Translation of the indexer 40 relative to the upper housing 28 causes the catch 122 to move toward and away from the second conduit outlet 64, thereby causing the end of the first conduit 44 attached to the catch 122 to translate toward and away from the second conduit outlet 64 in a like manner.

The knob 42 of the speed adjustment assembly 37 is also operatively connected to the cam 38, wherein the tabs 108 of the knob 42 are configured to secure the cam 38 to the knob 42, as shown in FIG. 9. Due to the attachment of the cam 38 to the knob 42, rotation of the knob 42 results in corresponding rotation of the cam 38, as shown by arrow D. An exemplary embodiment of the cam 38, as illustrated in FIGS. 12A-12B, includes a pair of apertures 124 formed through the thickness thereof. The apertures 124 are configured to receive the tabs 108 of the knob 42 to provide a positive engagement between the knob 42 and the cam 38. In an embodiment, the apertures 124 formed in the cam 38 are of different widths, and the tabs 108 of the knob 42 are likewise of similar corresponding and different widths. The different widths of the apertures 124 of the cam 38 ensure proper alignment of the cam 38 relative to the knob 42 during assembly.

As shown in FIGS. 12A-12B, the cam 38 also includes a second boss 126 extending upwardly from the surface of the cam 38 directed away from the indexer 40. The second boss 126 is configured to receive the end of the second wire 50 (FIG. 4) to provide an operative connection between the cam 38 and the second wire 50, wherein rotation of the cam 38 causes the second wire 50 to be extended and retracted relative to the second conduit 48.

The exemplary embodiment of the cam 38 further includes a plurality of notches 128 formed into a lateral edge 130 of the cam 38, as shown in FIGS. 12A-12B. The notches 128 are indentations toward the center of the cam 38 to provide an indexing mechanism wherein each of the notches 128 provides a different operational position of the knob 42 that is attached to the cam 38 as the cam 38 is rotated. The notches 128 are configured to receive the indexing spring 41 (FIG. 4). When the knob 42 is in a speed selector position, the spring 41 is positively engaged with one of the notches 128, thereby securing the cam 38 at a position corresponding to the speed selector position of the knob 42. When an operator desires to change the speed of the lawn mower 10, the knob 42 is rotated, thereby rotating the cam 38. Such rotation causes the spring 41 to become disengaged from the cam 38 until the cam 38 has been rotated enough that the spring 41 becomes aligned with one of the notches 128, at which point the spring 41 is received in the notch 128 to again positively locate the cam 38 and the knob 42. In an embodiment, each of the notches 128 formed into the lateral edge 130 of the cam 38 corresponds to a speed selector position marking 100.

Figure 13A:
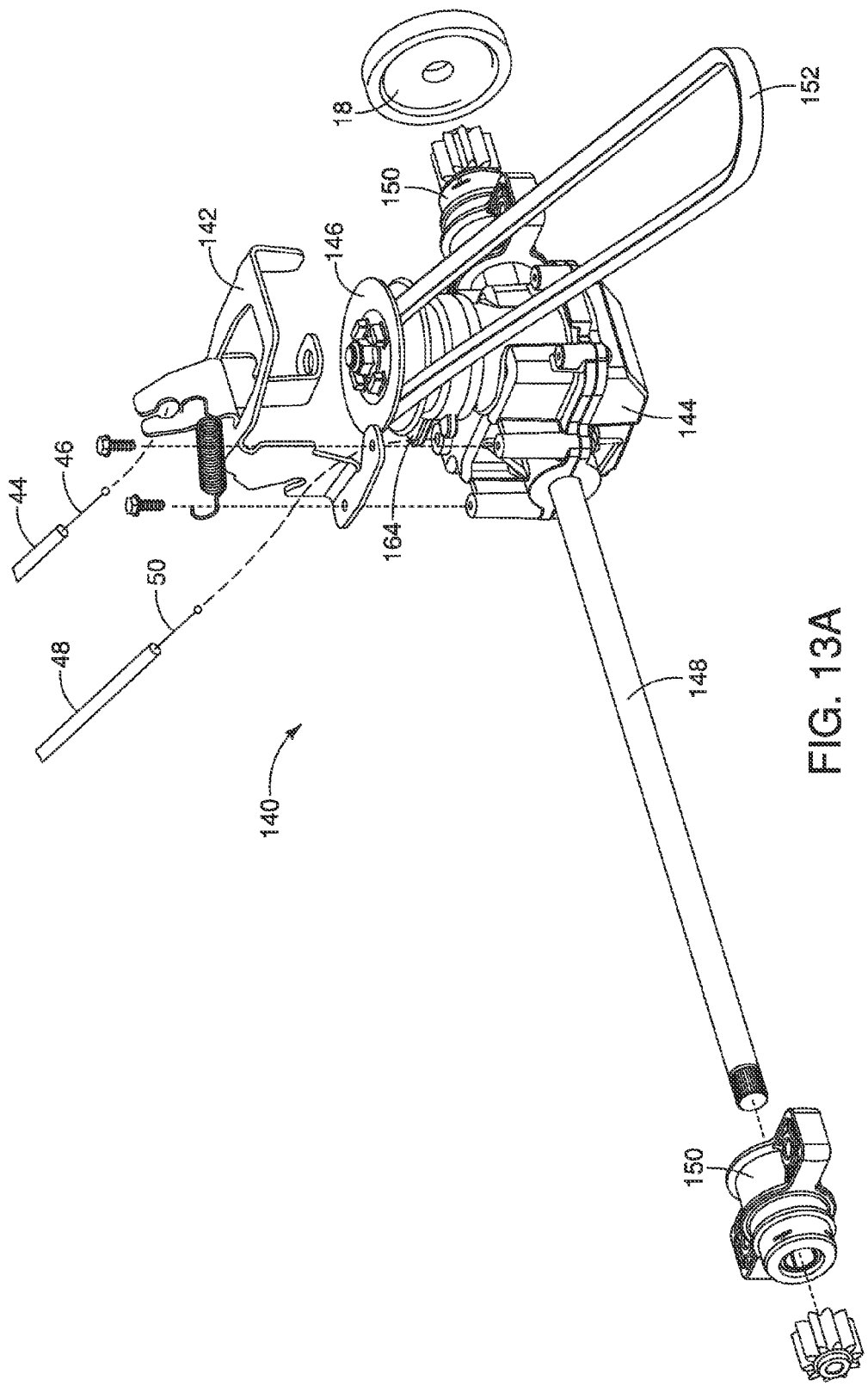
FIG. 13A is an exploded view of an exemplary embodiment of a transmission assembly.
Figure 13B:
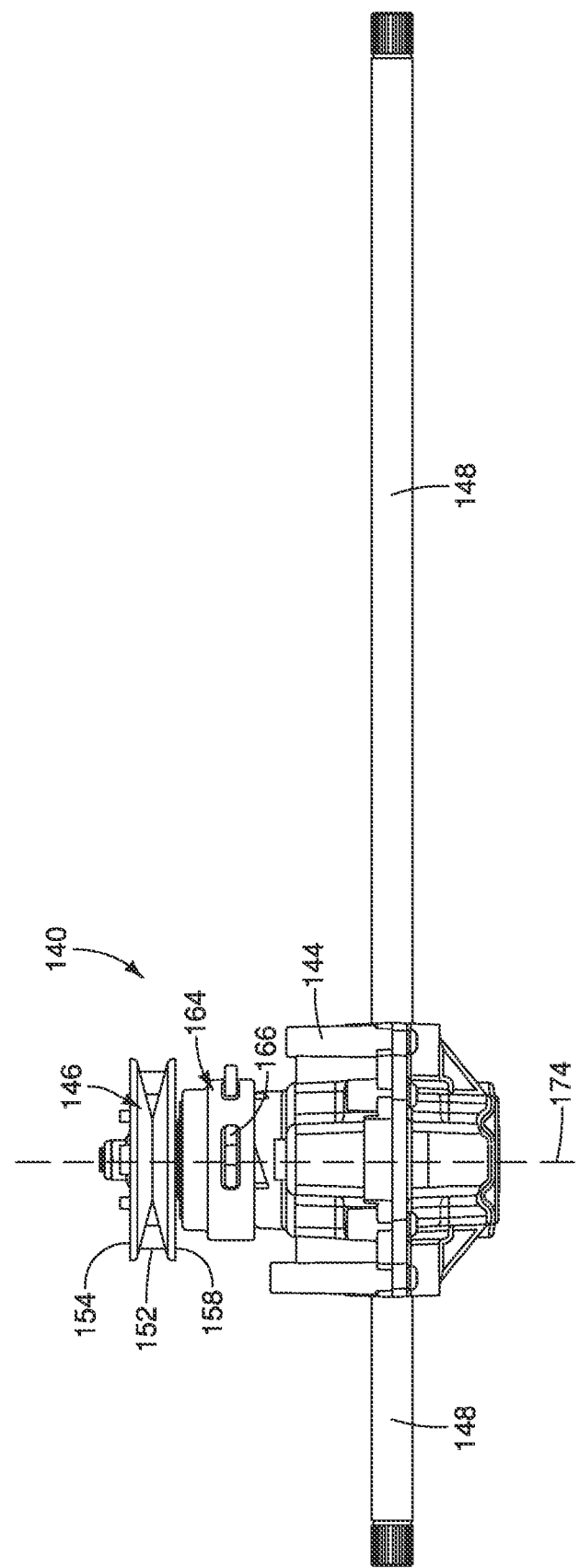
FIG. 13B is a front view of the transmission assembly shown in FIG. 13A.
Figure 13C:
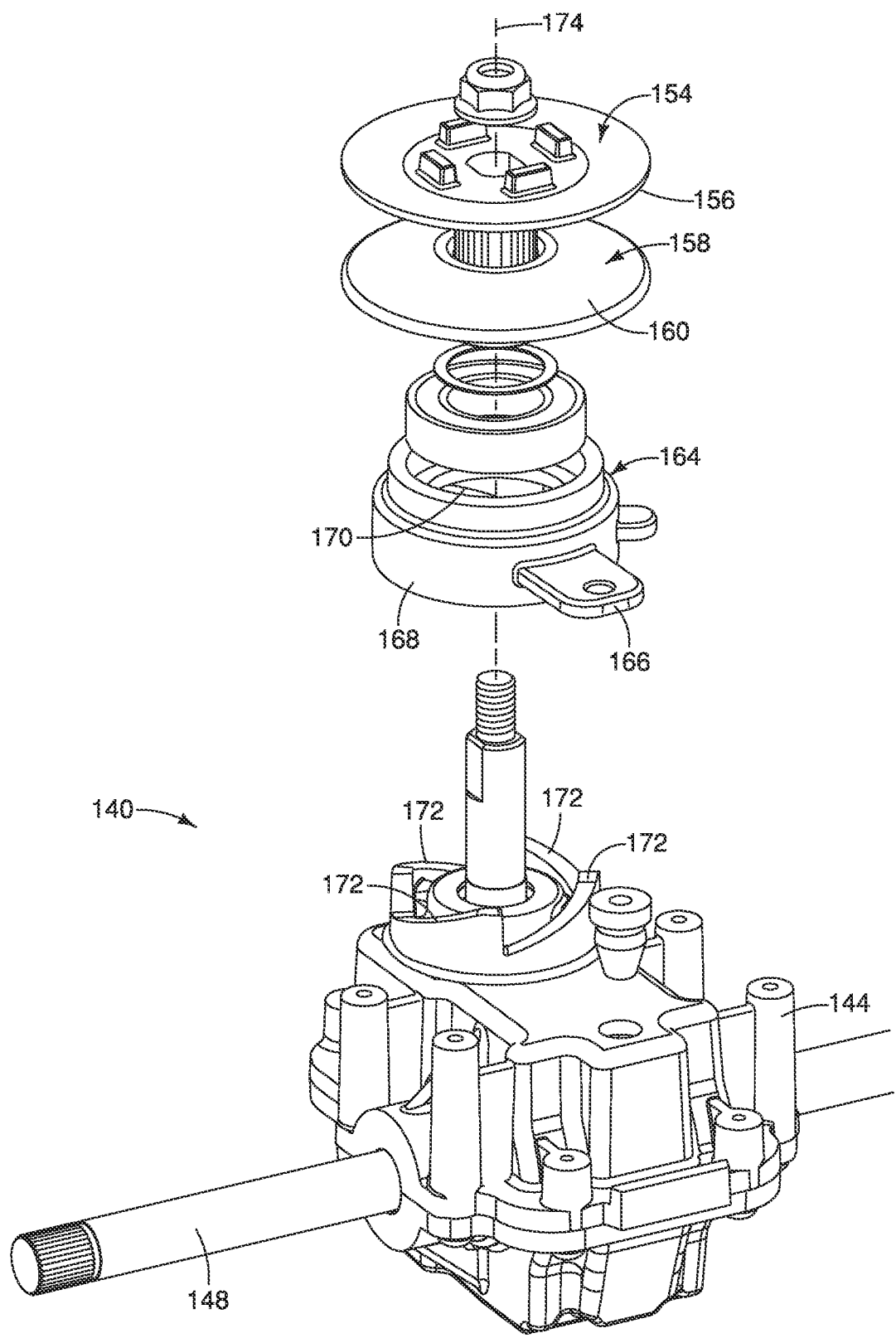
FIG. 13C is an exploded view of the transmission assembly shown in FIG. 13A.

The speed engagement assembly 33 described above is configured to selectively engage and disengage a multi-speed transmission assembly that provides rotational power to the wheels 18 of the lawn mower 10, and the speed adjustment assembly 37 is configured to selectively change the speed of the multi-speed transmission assembly when the transmission assembly is in the engaged state. FIGS. 13A-13C illustrates an exemplary embodiment of a multi-speed transmission assembly 140 configured to provide rotational power to a pair of opposing wheels 18 when selectively actuated by the first and second levers 34, 36 of the speed engagement assembly 33. The transmission assembly 140 is selectively rotatable in response to actuation of the first and second levers 34, 36. It should be understood by one of ordinary skill in the art that the adjustable speed transmission assembly 140 described herein is an exemplary embodiment and any other multi-speed transmission—including non-rotatable transmissions—can also be configured to be adjusted by the speed control assembly 12 described herein.

In an embodiment, the transmission assembly 140 includes a bracket 142 that is operatively connected to a housing 144 which has an adjustable first pulley 146 extending therefrom, as shown in FIGS. 13A-13B. The first pulley 146 is operatively connected to gear members (not shown) disposed within the housing 144 which are, in turn, connected to the drive shaft 148 that extends in opposing lateral directions from the housing 144. The rotation of the first pulley 146 is transferred to rotation of the drive shaft 148 by way of the gear members within the housing. It should be understood by one of ordinary skill in the art that the drive shaft 148 can be either a single member in which both ends of the drive shaft 148 rotate simultaneously or a two-piece assembly in which each section can rotate independent of the other. The drive shaft 148 extends along an axis that is substantially normal to the axis of rotation of the first pulley 146. The transmission assembly 140 is operatively attached to the deck 16 (FIG. 1) by way of opposing bearings 150.

The transmission assembly 140 is powered by the engine 14 by way of a v-shaped belt 152, as shown in FIGS. 13A-13B, which is configured to selectively provide rotational power to the transmission assembly 140. The belt 152 is configured to extend between and be in selective engage with the first pulley 146 and an opposing pulley (not shown) directly powered by the engine 14, thereby operatively coupling the transmission assembly 140 to the engine 14. Rotation of the first pulley 146 about a substantially vertical axis by the engine 14 is transferred through the gears within the housing 144 to the drive shaft 148 about a substantially horizontal axis. When the transmission assembly 140 is in the disengaged state the belt 152 is slack between the opposing pulleys such that there is no power transmitted from the engine 14 to the transmission assembly 140, and when the transmission assembly 140 is in the engaged state the belt 152 is taught between the opposing pulleys such that there is full transmission of rotational power between the engine 14 to the transmission assembly 140.

When the transmission assembly 140 is in the disengaged position, there is no rotational power transferred from the engine 14 due to slack in the belt 152 that connects the transmission assembly 140 to the engine 14. Similarly, when the transmission assembly is in the engaged position, there is a full transfer of rotational power from the engine 14 to the transmission assembly 140 due to the belt 152 being taught and the slack removed. In the exemplary embodiment of the transmission assembly 140 illustrated in FIGS. 13A-13C, the transmission assembly 140 is rotatable between a first operative position (or a disengaged position) and a second operative position (or an engaged position). In other words, rotation of the housing 144 and first pulley 146 of the transmission assembly 140 away from engine 14—from the disengaged position to the engaged position—increases the distance between the first pulley 146 and the corresponding engine pulley such that the slack in the belt 152 is removed. Similarly, rotation of the housing 144 and first pulley 146 of the transmission assembly 140 toward the engine 14—from the engaged position to the disengaged position—decreases the distance between the first pulley 146 and the corresponding engine pulley such that the belt 152 becomes slack which does not allow rotational power to be transferred between opposing pulleys.

This rotation of the transmission assembly 140 is accomplished by the first and second levers 34, 36 of the speed engagement assembly 33. The first and second levers 34, 36 are rotatable between a disengaged position and an engaged position, wherein the first and second levers 34, 36 are spaced apart from the cross bar 24 of the handle 20 when located in the disengaged position and the first and second levers 34, 36 are positioned immediately adjacent to the cross bar 24 when located in the engaged position. Rotation of either or both of the first and second levers 34, 36 to the engaged position causes the first boss 80 on the first lever 34 to rotate away from the first conduit outlet 62. Such rotation of the first boss 80 creates tension in the first wire 46, thereby pulling on the bracket 142 to rotate the transmission assembly 140 away from the engine 14 resulting in the slack in the belt 152 being removed and the transmission assembly 140 to be fully engaged with the engine 14 for transmission of rotational power therebetween. Rotation of the first and second levers 34, 36 to the disengaged position causes the first boss 80 to rotate toward the first conduit outlet 62, wherein the first wire 46 is retracted into the first conduit 44. As the first wire 46 is retracted, the transmission assembly 140 is rotationally biased toward the engine, thereby generating slack in the belt 152 and disengaging the transmission assembly 140 from the engine 14 so that no rotational power is transferred therebetween. It should be understood by one of ordinary skill in the art that the operator may "feather" the first and second levers 34, 36 between the disengaged position and the engaged position to partially engage the transmission assembly 140 and the engine 14 such that only a portion of the rotational power of the engine is transferred to the transmission assembly 140 due to slip of the belt 152 about the pulleys.

Once the transmission assembly 140 is in the engaged position, the operator can selectively adjust the speed output from the transmission assembly 140 to the wheels 18. In an embodiment, the first pulley 146 of the transmission assembly 140 includes a substantially fixed upper pulley member 154 having an upper bearing surface 156 and a translatable lower pulley member 158 having a lower bearing surface 160 with a gap 162 between the upper and lower bearing surfaces 156, 160, as shown in FIGS. 14A-14B. The lower pulley member 158 is movable relative to the upper pulley member 154, whereas the upper pulley member 154 remains substantially fixed as it is operatively connected to the housing 144. The lower pulley member 158 is selectively positionable in a plurality of operative positions relative to the upper pulley member 154.

In the exemplary embodiment of the transmission assembly 140 shown in FIGS. 13A-13C, the transmission assembly 140 includes a rotatable actuator 164, and the actuator 164 is configured to selectively move the lower pulley member 158 relative to the upper pulley member 154. The actuator 164 includes a control tab 166 extending radially outward from the outer surface of the body 168. A plurality of first bearing surfaces 170 (partially shown in FIG. 13C) are directed downwardly and formed on the inner surface of the body 168. The first bearing surfaces 170 of the actuator 164 correspond to the second bearing surfaces 172 extending upwardly from the housing 144. The second bearing surfaces 172 remain substantially fixed with respect to the housing 144, whereas the first bearing surfaces 170 are rotatable relative to the second bearing surfaces 172 in response to the rotation of the actuator 164. The first and second bearing surfaces 170, 172 are slidingly engageable, and rotation of the actuator 164 results in corresponding translational movement of the actuator 164 relative to the housing 144 with respect to the rotational axis 174 of the first pulley 146. Because the actuator 164 is operatively connected to the lower pulley member 160, translational movement of the actuator 164 toward and away from the housing 144 causes corresponding translational movement of the lower pulley member 160 relative to the upper pulley member 154. Although the above description explains the change in output rotational speed resulting from the lower pulley member 160 being translatable relative to the upper pulley member 154, it should be understood by one of ordinary skill in the art that the transmission assembly 140 can be configured such that the upper pulley member 154 is translatable relative to a substantially fixed lower pulley member 160 to adjust the effective diameter of the first pulley 146.

The lower pulley member 160 is selectively positionable by rotating the knob 42 of the speed adjustment assembly 37. The knob 42 is attached to the cam 38, which is, in turn, operatively connected to an end of the second wire 50. Because the corresponding end of the second conduit 48 is attached to the casing 31 such that the conduit 48 remains substantially fixedly positioned, the second wire 50 is extended from and retracted into the second conduit 48 in response to rotation of the cam 38. The opposing end of the second conduit 48 is attached to the bracket 142 of the transmission assembly 140 and the corresponding end of the second wire 50 is operatively connected to a control tab 166 of the actuator 164. Rotation of the knob 42 causes the second wire 50 to be extend from or retracted into the second conduit 48, wherein the end of the second wire 50 causes the actuator 164 of the transmission assembly 140 to rotate about the axis 174, thereby resulting in the first bearing surfaces 170 to slide relative to the second bearing surfaces 172 and the actuator 164 to translate relative to the housing 144 which causes the lower pulley member 160 to translate relative to the upper bearing member 154, and such translation of the lower pulley member 160 relative to the upper pulley member 154 changes the effective diameter of the first pulley 146 which results in a change in output rotational speed of the drive shaft 148.

The upper housing 28 of the speed control assembly 12 includes a plurality of speed selector position markings 100 that provide a visual reference that allows the operator to observe the current relative speed selected. In an embodiment, the knob 42 of the speed adjustment assembly 37 is adjustable between four (4) selectable operative positions, as shown in FIG. 2. It should be understood by one of ordinary skill in the art that the knob 42 can be rotatable between any quantity of operative positions. It should also be understood by one of ordinary skill in the art that the knob 42 can also infinitely adjustable to provide for any number of different relative speeds of the lawn mower 10. When the knob 42 is rotated clockwise to the end of the range of motion thereof, the knob 42 is in the first operative position and located adjacent to the first speed selector position marking 100; when the knob 42 is in rotated counter-clockwise slightly, the knob 42 is moved into the second operative position such that the knob is located adjacent to the second speed selector position marking 100; and the knob 42 is rotatable between each of the remaining operative positions that correspond to another speed selector position marking 100.

In an embodiment, the lower pulley member 160 is positionable in four (4) distinct operative positions. The quantity of operative positions of the lower pulley member 160 corresponds to the same quantity of operative positions of the knob 42 of the speed adjustment assembly 37. The speed adjustment assembly 37 is described herein as having a knob 42 with four operative positions for illustrative purposes, but one of ordinary skill in the art should understand that the knob 42 may be rotatable between any quantity of operative positions for providing a corresponding quantity of operative positions of the lower pulley member 160. For example, when the knob 42 is located in a first operative position, the lower pulley member 160 is located in the corresponding first operative position; in a similar manner, when the knob 42 is located in the fourth operative position, the lower pulley member 160 is located in the corresponding fourth operative position.

As the knob 42 of the speed adjustment assembly 37 is rotated from the first operative position (FIG. 14A) to the fourth operative position (FIG. 14B), the lower pulley member 160 translates away from the lower upper member 154 such that the gap 162 between the upper bearing surface 156 and the lower bearing surface 160 increases. In a similar manner, as the knob 42 is rotated from the fourth operative position to the first operative position, the lower pulley member 160 translates toward the upper pulley member 154 such that the gap 162 between the upper bearing surface 156 and the lower bearing surface 160 decreases. The movement of the lower pulley member 160 relative to the upper pulley member 154 effectively changes the diameter of the first pulley 146.

The effective diameter of the first pulley 146 changes in response to the width of the gap 162 between the upper and lower bearing surfaces 156, 160 in cooperation with the size of the V-shaped belt 152. For example, when the lower pulley member 160 is located in a first operative position (FIG. 14A) and the transmission assembly 140 is in the engaged state, the belt 152 contacts the upper and lower bearing surfaces 156, 160 at first distance $D_1$ spaced apart from the rotational axis of the first pulley 146. This first distance $D_1$ equates to a first effective diameter of the first pulley 146. When the lower pulley member 160 is located in a fourth operative position (FIG. 14B) and the transmission assembly 140 is in the engaged state, the belt 152 contacts the upper and lower bearing surfaces 156, 160 at a second distance $D_2$ spaced apart from the rotational axis of the first pulley 146. This second distance $D_2$ equates to a second effective diameter of the first pulley 146, wherein the second distance $D_2$ is less than the first distance $D_1$. As a result, as the effective diameter of the first pulley 146 decreases the rotational speed of the first pulley 146 increases when the diameter of the opposing pulley remains fixed and the rotational speed of the driving pulley of the engine 14 remains constant. The increased rotational speed of the first pulley 146 also likewise increases the rotational speed of the drive shaft 148 which results in the wheels 18 rotating faster and driving the lawn mower 10 at a faster speed. It should be understood by one of ordinary skill in the art that when the lower pulley member 160 is positioned at a location between the first and fourth operative positions that the effective diameter of the first pulley 146 is proportional to the operative position between the first and fourth operative positions.

The position of the transmission assembly 140 must compensate for the change in effective diameter of the first pulley 146. In other words, as the lower pulley member 160 translates away from the upper pulley member 154, the effective diameter of the first pulley 146 decreases. However, the position of the pulley (not shown) extending from the engine as well as the relative rotational position of the transmission assembly 140 remains in substantially in the same positions, and the length of the belt 152 remains. As a result, as the lower pulley member 160 translates away from the upper pulley member 154 and the gap 162 widens such that the belt 152 contacts the upper and lower bearing surfaces 156, 160 at a location closer to the rotational axis of the first pulley 146 causing slack in the belt 152. To compensate for this slack in the belt 152 as a result in the change of speed by the knob 42, the knob 42 is also operatively connected to the indexer 40. One end of the first conduit 44 is attached to the catch 122 of the indexer 40, and as the knob 42 is rotated the rotational movement of the knob 42 is transferred to translational movement of the indexer 40 and the arm 120 thereof. As the indexer 40 translates, the end of the first conduit 44 translates in a like manner within the casing 31, and the movement of the end of the first conduit 44 attached to the indexer 40 results in corresponding movement of the bracket 142 and rotation of the transmission assembly 140 relative to the engine 14. For example, rotating the knob 42 from the first operative position to the second operative position—to increase the speed output of the transmission assembly 140—causes the lower pulley member 160 to translate away from the upper pulley member 154 to increase the rotational speed of the first pulley 146, but the decrease in the effective diameter of the first pulley 146 causes slack in the belt 152. However, this rotation of the knob 42 also causes the arm 120 of the indexer 40 to translate away from the first conduit outlet 62 which pulls the end of the first conduit 44 attached thereto, and the movement of the one end of the first conduit 44 results in the opposing end of the first conduit 44 that is attached to the bracket 142 to cause the transmission assembly 140 to rotate away from the engine 14, thereby taking up the slack that was caused by the decreased effective diameter of the first pulley 146. Further rotation of the knob 42 from the second operative position to the third or fourth operative positions for additional speed increase similarly reduces the effective diameter of the first pulley 146, but the slack in the belt 152 is offset by additional rotation of the transmission assembly 140 away from the engine 14 caused by further translation of the indexer 40 away from the first conduit outlet 62.

The transmission assembly 140 is operatively coupled to the speed engagement assembly 33 and the speed adjustment assembly 37 of the speed control assembly 12. In an embodiment, the speed engagement assembly 33 is operatively connected to the transmission assembly 140 for selectively actuating the transmission assembly 140 between an engaged position and a disengaged position with respect to the engine 14, and the speed adjustment assembly 37 is operatively connected to the transmission assembly 140 for selectively changing the relative location of the lower pulley member 160 with respect to the upper pulley member 154 which results in a change in the effective diameter of the first pulley 146 and hence the relative rotational output speed of the drive shaft 148. In operation, the first and second levers 34, 36 of the speed engagement assembly 33 extend from the casing 31 to allow an operator to selectively engage and disengage the transmission assembly 140 (FIGS. 14A-14B). When the transmission assembly 140 is engaged, there is full transmission of rotational power from the engine 14 to the wheels 18 for self-propelling the lawn mower 10. Also when the transmission assembly 140 is engaged, the operator is able to selectively adjust the output rotational speed of the transmission assembly 140—resulting in an adjustment of the travel speed of the lawn mower 10—by rotating the knob 42 of the speed adjustment assembly 37.

While preferred embodiments of the present invention have been described, it should be understood that the present invention is not so limited and modifications may be made without departing from the present invention. The scope of the present invention is defined by the appended claims, and all devices, process, and methods that come within the meaning of the claims, either literally or by equivalence, are intended to be embraced therein.

What is claimed is:

1. A method for controlling the speed of a self-propelled walk-behind lawn mower having a deck and a handle operatively connected thereto, said method comprising:
   providing a pair of driven wheels rotatably connected to said deck;
   providing a transmission assembly operatively connected to said pair of driven wheels and said deck of said lawn mower, said transmission assembly being selectively rotatable between an engaged position and a disengaged position, said transmission assembly generating a selectively variable rotational output to said pair of driven wheels when said transmission assembly is in said engaged position;
   providing a speed control assembly attachable to said handle of said lawn mower, said speed control assembly comprising:
   a casing;
   a pair of levers rotatably connected to said casing and operatively connected to said transmission assembly, and each of said pair of levers being movable between a first operative position and a second operative position for selectively rotating said transmission assembly between said engaged position and said disengaged position; and
   a knob rotatably connected to said casing and operatively connected to said transmission assembly, said knob being rotatable between a plurality of operative positions for selectively varying said rotational output of said transmission assembly to said driven wheels; and actuating at least one of said pair of levers to cause rotation of said at least one of said pair of levers from said first operative position in which said transmission assembly is located in said disengaged position to said second operative position which rotates said transmission assembly to said engaged position, wherein maintaining actuation of said at least one of said pair of levers in said second operative position by grasping said at least one of said pair of levers causes said transmission to be maintained in said engaged position.

2. The method of claim 1 further comprising rotating one of said pair of levers from said second operative position in which said transmission assembly is located in said engaged position to said first operative position which moves said transmission assembly to said disengaged position.

3. The method of claim 1, wherein said transmission assembly is biased toward said disengaged position, thereby biasing said pair of levers toward said first operative position.

4. The method of claim 1, wherein at least one of said pair of levers is independently rotatable relative to the other of said pair of levers.

5. The method of claim 1, wherein said transmission assembly comprises:
a housing;
a pulley rotatably driven by a belt extending between said pulley and an engine, wherein said pulley is connected to said housing; and
a drive shaft partially disposed within said housing, said drive shaft being operatively coupled to said pulley and said pair of driven wheels, wherein rotation of said first pulley is transferred into rotation of said drive shaft to produce a rotational output of said drive shaft to drive a pair of ground-engaging wheels when said housing is in an engaged position,
wherein movement of said housing selectively actuates said housing between an said engaged position and a disengaged position.

6. A method for controlling the speed of a self-propelled walk-behind lawn mower having a deck and a handle extending therefrom, said method comprising:
providing a pair of driven wheels rotatably connected to said deck;
providing a transmission assembly operatively connected to said pair of driven wheels and said deck of said lawn mower, said transmission assembly being selectively adjustable between an engaged position and a disengaged position, said transmission assembly generating a selectively variable rotational output to said pair of driven wheels when said transmission assembly is in said engaged position;
providing a speed control assembly attached to said handle of said lawn mower, said speed control assembly comprising:
a casing;
a pair of levers rotatably connected to said casing and operatively connected to said transmission assembly, and said pair of levers being movable between a first operative position and a second operative position for selectively moving said transmission assembly between said engaged position and said disengaged position, wherein maintaining at least one of said pair of levers in one of said operative positions by grasping said at least one of said pair of levers causes said transmission to be maintained in said engaged position; and
a knob rotatably connected to said casing and operatively connected to said transmission assembly, said knob being rotatable between a plurality of operative positions for selectively varying rotational output of said transmission assembly to said driven wheels; and
rotating said knob from a first of said plurality of operative positions to a second of said plurality of operative positions which increases said rotational output of said transmission assembly to said driven wheels.

7. The method of claim 6 further comprising rotating said knob from said second operative position to said first operative position which decreases said rotational output of said transmission assembly to said driven wheels.

8. The method of claim 7, wherein said knob is rotatable between four operative positions, and wherein said rotational output of said transmission assembly to said driven wheels is slowest when said knob is located in said first operative position and said rotational output of said transmission assembly to said driven wheels is fastest when said knob is located in a fourth operative position.

9. The method of claim 6, wherein said transmission assembly comprises:
a housing;
a pulley rotatably driven by a belt extending between said pulley and an engine, said pulley is operatively connected to said housing, said pulley having an upper pulley member, a lower pulley member, and an effective diameter directly relating to a distance between said upper pulley member and said lower pulley member, wherein said lower pulley member is movable relative to said upper pulley member; and
a drive shaft partially disposed within said housing, said drive shaft being operatively coupled to said pulley, wherein rotation of said pulley produces said rotational output of said drive shaft to drive a pair of ground-engaging wheels when said housing is in an engaged position,
wherein movement of said lower pulley member relative to said upper pulley member changes said distance between said upper and lower pulley members, wherein said change in said distance changes said effective diameter of said first pulley which results in a change of speed of said rotational output of said drive shaft.

10. A method for controlling the speed of a self-propelled walk-behind lawn mower having a deck and a handle extending therefrom, said method comprising:
providing a pair of driven wheels rotatably connected to said deck;
providing a transmission assembly operatively connected to said pair of driven wheels and said deck of said lawn mower, said transmission assembly being selectively adjustable between an engaged position and a disengaged position, said transmission assembly generating a selectively variable rotational output to said pair of driven wheels when said transmission assembly is in said engaged position;
providing a speed control assembly attached to said handle of said lawn mower, said speed control assembly comprising:
a casing;
a pair of levers rotatably connected to said casing and operatively connected to said transmission assembly, and said pair of levers being movable between a first operative position and a second operative position for selectively moving said transmission assembly between said engaged position and said disengaged position, wherein maintaining at least one of said pair of levers in one of said operative positions by grasping said at least one of said pair of levers causes said transmission to be maintained in said engaged position; and a knob rotatably connected to said casing and operatively connected to said transmission assembly, said knob being rotatable between a plurality of operative positions for selectively varying rotational output of said transmission assembly to said driven wheels; and rotating knob from a first of said plurality of operative positions to a second of said plurality of operative positions which increases said rotational output of said transmission assembly to said driven wheels or rotating at least one of said at least one lever from said first operative position in which said transmission assembly is located in said disengaged position to said second operative position which moves said transmission assembly to said engaged position.

\* \* \* \* \*